US008504452B2

(12) United States Patent  
Spradling et al.

(10) Patent No.: US 8,504,452 B2  
(45) Date of Patent: Aug. 6, 2013

(54) METHOD AND SYSTEM FOR AUDITING INTERNAL CONTROLS

(75) Inventors: L. Scott Spradling, Fort Worth, TX (US); Stephen W. Lindsey, Fort Worth, TX (US)

(73) Assignee: Thomson Reuters Global Resources (CH)

( * ) Notice: Subject to any disclaimer, the term of this patent is extended or adjusted under 35 U.S.C. 154(b) by 1022 days.

(21) Appl. No.: 12/009,337

(22) Filed: Jan. 18, 2008

(65) Prior Publication Data

US 2009/0187437 A1 Jul. 23, 2009

(51) Int. Cl.  
*G06Q 40/00* (2012.01)  
*G06Q 40/06* (2012.01)  
*G06F 21/57* (2013.01)

(52) U.S. Cl.  
CPC .............. *G06Q 40/00* (2013.01); *G06F 21/577* (2013.01); *G06Q 40/06* (2013.01)  
USPC ........................................................ 705/35

(58) Field of Classification Search  
CPC ......... G06Q 40/00; G06Q 40/06; G06F 21/577  
USPC ............................................................ 705/35  
See application file for complete search history.

(56) References Cited

U.S. PATENT DOCUMENTS

| | | | |
|---|---|---|---|
| 6,009,442 A | 12/1999 | Chen et al. | |
| 6,311,166 B1 * | 10/2001 | Nado et al. | 705/30 |
| 6,314,415 B1 | 11/2001 | Mukherjee | |
| 6,810,404 B1 | 10/2004 | Ferguson et al. | |
| 6,820,094 B1 | 11/2004 | Ferguson et al. | |
| 6,993,502 B1 | 1/2006 | Gryglewicz et al. | |
| 7,158,962 B2 | 1/2007 | Nelson | |

(Continued)

FOREIGN PATENT DOCUMENTS

WO WO 95/08810 3/1995

OTHER PUBLICATIONS

Reimers, J., Wheeler, S., & Dusenbury, R. (1993). The effect of response mode on auditors' control risk assessments. Auditing, 12(2), 62-62. Retrieved Mar. 22, 2013.*

(Continued)

*Primary Examiner* — Kito R Robinson  
(74) *Attorney, Agent, or Firm* — Valenti Hanley & Robinson, PLLC; Kevin T. Duncan

(57) ABSTRACT

The present invention provides a computer-implemented method and system for assessing internal controls. The method includes: presenting internal control items; processing an input set associated with at least some of the internal control items; and (c) generating a set of assessment information based on the processed input set. The method may further include one or more of: (d) prior to presenting, automatically grouping and presenting a subset of the plurality of internal financial control items based on a user input related to an assessment of risk; (e) prior to presenting, automatically presenting a previously identified risk associated with one or both of an audit area and a transaction class associated with a subset of the plurality of internal financial control items; (g) receiving a user test input designating an internal financial control item for testing and presenting a set of test procedures associated with the designated internal financial control item; (h) documenting assessments with the set of test procedures; and (i) receiving from a user a plurality of inputs representing user assessment of the effectiveness of internal financial control items and presenting a summary of the effectiveness assessments.

89 Claims, 21 Drawing Sheets

U.S. PATENT DOCUMENTS

| | | | |
|---|---|---|---|
| 7,447,650 B1 * | 11/2008 | Gutierrez et al. | 705/35 |
| 2004/0093293 A1 * | 5/2004 | Cheung | 705/36 |
| 2004/0103102 A1 | 5/2004 | Nelson | |
| 2004/0260591 A1 | 12/2004 | King | |
| 2004/0260628 A1 * | 12/2004 | Minton et al. | 705/30 |
| 2004/0267660 A1 | 12/2004 | Greenwood et al. | |
| 2005/0060382 A1 | 3/2005 | Spector et al. | |
| 2005/0065839 A1 * | 3/2005 | Benson et al. | 705/10 |
| 2005/0091184 A1 | 4/2005 | Seshadri et al. | |
| 2005/0091674 A1 | 4/2005 | Knight et al. | |
| 2005/0138031 A1 * | 6/2005 | Wefers | 707/9 |
| 2005/0166139 A1 | 7/2005 | Pittman et al. | |
| 2005/0197952 A1 | 9/2005 | Shea et al. | |
| 2005/0209876 A1 | 9/2005 | Kennis et al. | |
| 2006/0015482 A1 | 1/2006 | Beyer et al. | |
| 2006/0047561 A1 | 3/2006 | Bolton | |
| 2006/0053168 A1 | 3/2006 | McDougall et al. | |
| 2006/0059026 A1 | 3/2006 | King et al. | |
| 2006/0074739 A1 | 4/2006 | King et al. | |
| 2006/0074980 A1 | 4/2006 | Sarkar | |
| 2006/0089861 A1 | 4/2006 | King et al. | |
| 2006/0106686 A1 | 5/2006 | King et al. | |
| 2006/0129441 A1 | 6/2006 | Yankovich et al. | |
| 2006/0212373 A1 | 9/2006 | Maxwell et al. | |
| 2006/0212486 A1 | 9/2006 | Kennis et al. | |
| 2006/0241991 A1 | 10/2006 | Pudhukottai et al. | |
| 2006/0247965 A1 | 11/2006 | Griffith et al. | |
| 2006/0259316 A1 | 11/2006 | Breslin | |
| 2006/0277160 A1 | 12/2006 | Singh et al. | |
| 2007/0136622 A1 | 6/2007 | Price et al. | |
| 2007/0156495 A1 | 7/2007 | King et al. | |
| 2007/0179742 A1 | 8/2007 | Tabanou et al. | |
| 2007/0233508 A1 | 10/2007 | Gillespie | |
| 2008/0077530 A1 * | 3/2008 | Banas et al. | 705/50 |
| 2008/0154866 A1 | 6/2008 | Beyer et al. | |
| 2009/0112741 A1 * | 4/2009 | Kershner et al. | 705/30 |
| 2009/0113324 A1 * | 4/2009 | Spradling et al. | 715/764 |

OTHER PUBLICATIONS

Understanding the entity and its environment and assessing the risks of material misstatement. (2006). Journal of Accountancy, 201(5), 129-145. Retrieved Mar. 22, 2013.*

Pricewaterhouse Coopers—The PwC Audit, A Continuous Improvement Approach to Audit Methodology, powerpoint presentation, 34 pages.

Pricewaterhouse Coopers—TeamMate—Audit Management System & More!, powerpoint presentation by Pamela McCoy, Director of TeamMate Product Team, 5 pages.

Deloitte LLP—A Complete Suite of Technology Tools, Article on www.deloitte.com, 9 pages.

CCH, A Wolters Kluwer Business—Tools and Practice Aids, ProSystem fx Knowledge Tools, 20 pages.

* cited by examiner

METHOD AND SYSTEM FOR AUDITING INTERNAL CONTROLS

FIELD OF THE INVENTION

The present invention relates to the provision of and tools to assist in the provision of professional services, specifically including auditing services, preparing financial statement, conducting internal and external audits of internal controls and practices. More particularly, the present invention relates to computer-implemented tools, resources, and processes for assisting in these efforts.

BACKGROUND OF THE INVENTION

As companies continue to strive for efficiency, consistency and flexibility, computers and software executed on computers are increasingly relied upon to automate, semi-automate, enhance, quicken and make reliable and uniform business processes. This is true even in fields of professional service providers, such as financial auditors, and fields in which standardized procedures and documents govern acceptable and "best" practices. For instance, organizations, such as FASAB (Federal Accounting Standards Advisory Board), FASB (Financial Accounting Standards Board), AICPA (American Institute of Certified Public Accountants), IASB (International Accounting Standards Board), the SEC, and PCAOB (Public Company Accounting Oversight Board) promulgate rules and regulations, e.g., GAAS (generally accepted auditing standards), GAAP (generally accepted accounting principles), and IFRS (International Financial Reporting Standards), that govern the way companies are reviewed for integrity of financial accounting and operation. GAAS is principally comprised of ten auditing standards developed by AICPA that establish general standards (3) and standards related to field work (3) and reporting (4), including whether the report is in accordance with GAAP, and related interpretations. In addition, the SEC (Securities and Exchange Commission) provides guidance and laws, such as Sarbanes-Oxley Act ("SOX") and other laws and regulations provide guidance and requirements for compliance in reporting and other aspects concerning integrity of business operation and management.

In addition, in light of Sarbanes Oxley and other laws governing corporate governance and reporting, the Committee Of Sponsoring Organizations (COSO) has published, e.g., for use by audit professionals in auditing financial statements or corporate compliance officers, a framework for evaluating internal controls used by corporations that are required to report to the Securities Exchange Commission or similar agency. The COSO framework provide a generally recognized appropriate industry/professional standard for performing evaluation of internal controls, including five elements or factors to be considered when evaluating internal controls: 1) control environment; 2) risk assessment, 3; information and communication; 4) monitoring, and 5) control activities.

In the field of auditing, although GAAP and GAAS provide guidelines by which auditors should conduct audits, there is a significant amount of leeway and many variables that leave to the professional and his or her assessments determining the set of procedures required under the particular set of circumstances. This may also depend on the purpose and the intended audience to receive and interpret/rely on the report, and whether the entity being audited is public or non-public or governmental. Whether public or non-public, investors, banks, and other persons of interest rely on financial accounting information when determining whether to invest in a company, grant a loan to a company, merge with a company, etc. Standards are intended to promote best practices and uniformity, and therefore reliability, in the auditing process so that the resulting report may be viewed as unbiased, accurate and trustworthy.

Companies, such as Thomson Corporation, provide tools, resources and services to assist accountants and auditors. For instance, Thomson PPC's e-Practice Aids is a series of titles or Guides that give guidance and provide materials and procedures consistent with standards, e.g., *PPC's Guide To Audit Of Nonpublic Companies*, $25^{th}$ Edition, January 2007. Auditors may rely on the Guides or titles in conducting audits. Electronic tools, for instance Thomson's e-Tools, and electronic versions of guides, Thomson e-Practice Aids, help auditors take their tools and resources with them when conducting field work or may make them accessible from remote locations or at least electronically. Computers are also helpful in collecting client data and capturing assessment data. What is needed is an integrated system for conducting audits and for processing collected and risk related assessment data to determine and generate and present a suggested audit approach and set of procedures consistent with relevant standards and guides.

Associated with audits, as well as in-house efforts to establish and maintain internal control practices, SOX 404 requires public companies to (i) establish, maintain, and assess their internal control over financial reporting and (ii) obtain an opinion of their independent auditors as to the effectiveness of their internal control. One overriding goal of internal control over financial reporting is to promote the preparation of reliable financial statements. Assessing internal control practices is essential to identify material weaknesses and risks that may cause a material misstatement in the financial statements.

The SEC, in its Statement on Management's Report on Internal Control Over Financial Reporting, provided guidance in the area of internal controls. This SEC Guidance stated that management and auditors must use reasoned judgment and a top-down, risk-based approach to compliance with SOX 404. In addition, the SEC provided that the internal control audit and the financial statement audit should be integrated and that internal controls over financial reporting should be tailored to reflect the nature and size of the company. Also, the SEC recommended frequent dialogue between a company and its auditors to promote improved internal controls and improved financial reports. The SEC Guidance also recommended customizing internal control testing programs and stated that a "risk-based" approach to internal control testing should be used.

Risk-based testing requires management to prioritize areas of the company's financial statements according to relative levels of risk of misstatement. The risk-based approach requires extensive testing of related controls. In taking a "top-down" approach, the SEC guided management to identify controls related to each relevant area of a company's financial statements and to design appropriate documentation and testing procedures relative to each such area's risk level. However, the SEC provided that testing programs should be designed to assess those internal controls that affect the reliability of financial reporting and lead to "reasonable assurance" of reliability and not absolute assurance. Accordingly, testing programs need not test every step but must be sufficient to support a conclusion that the process meets the control objective. SEC guides that testing programs should focus on the objective of controls in determining the overall effectiveness, rather than individual steps. Where a control deficiency is uncovered through testing and assessment, a quantitative analysis is performed to determine its level of significance.

While the SEC guidelines are directed primarily to management, the PCAOB directs its guidance to professionals involved in providing audits. PCAOB guidance provides that auditors should integrate the internal control audit with the financial statements audit; exercise judgment to tailor audits to specific risks; use a top-down approach that begins with company-level controls to identify for further testing only the accounts and processes that are relevant to internal control over financial reporting; use risk assessment to remove accounts and processes that represent a remote risk of material misstatement. The PCAOB guides auditors to review and assess whether client systems of internal financial controls provide reasonable assurance that financial statements do not contain material misstatements. PCAOB guides auditors to take a "top-down" approach in audits of internal controls, meaning that auditors should first concentrate on company-level controls and then on significant accounts and to examine significant processes and before individual controls. This steers the audit toward areas of higher risk and away from those not likely to have a material impact on financial statements. The PCAOB guides auditors to use a risk-based approach in auditing internal controls to reduce costs while increasing audit effectiveness by focusing efforts on areas of higher risk.

SUMMARY OF THE INVENTION

The present invention addresses the shortcomings of the prior art and provides, among other things, a powerful computer-implemented tool to assist in auditing internal controls and for generating procedures, conducting audits, preparing financial statements, and coordinating documents and other work product. More particularly, the present invention relates to a system of creating and generating auditing procedures, and assessing internal controls, in response to identified risks and risk assessments.

In one respect, the invention provides a professional services audit tool that includes an application that performs a variety of functions such as completing certain audit planning processes/forms (including assessing risks related to the financial statements being audited and assessing internal controls), offering a top-down and risk-based approach to assessing internal controls. The internal control assessment invention may be used in combination with other auditing tools and programs, e.g., Thomson Corporation's PPC SMART e-Practice suite of products. The present invention utilizes efforts and data collected in performing risk assessments to help assess design deficiencies and overall effectiveness of internal controls. The present invention provides test procedures to assist the auditor, internal or external, in assessing internal controls.

The present invention may be integrated with audit tools, such as Thomson's SMART e-Practice Aids-Risk Assessment software, and may be linked with audit sources such as Checkpoint. The tool allows auditors to apply a "how to, risk-based, top-down" process for efficiently evaluating internal control over financial reporting and, where desired, testing only the minimum number of controls necessary to support reduced control risk assessments and limit substantive testing. The tool may be an integrated component of audit solutions, such as the SMART e-Practice Aid suite, allowing the auditor to optimize the overall audit planning process.

Since the process delivered by this tool is based on the extensive experience of recognized experts in the internal control field, the tool provides auditors with increased confidence in evaluating internal control and identifying control risks.

The auditor as described in the present invention is intended to include every person who may use the program to assess risk facing an enterprise and internal controls implemented to alleviate such risks. The applications in the context of auditing cover, for example, the following categories: accounting, audit & attest; compilation and review; non-profit organizations; governments; specialized industries; and bookkeeping services.

In conjunction with the use of the present invention, audit procedures are created using a logic system based primarily on the input of assertions associated with Risk of Material Misstatement (RMM), but include such other facts as fraud risks. In one manner, when one or more or a particular combination of assertions are evaluated to be "high," the present invention associates such identified risks with internal control components, audit areas, transaction classes, and internal control items and presents the risks to the user involved in assessing and testing internal controls. The term "assertion" as used herein means representations that are embodied in components being audited.

The present invention is intended to be medium-neutral, being equally capable as a desktop program, a web-enabled program, a web-based program, and any variation thereof, being broad enough to include all future mediums.

In one embodiment, the present invention provides a computer-implemented method for assessing a plurality of internal financial control items. The method includes: (a) presenting the plurality of internal financial control items; (b) processing an input set associated with at least some of the plurality of internal financial control items; and (c) generating a set of assessment information based on the processed input set. The method may further include one or more of: (d) prior to presenting, automatically grouping and presenting a subset of the plurality of internal financial control items based on a user input related to an assessment of risk; (e) prior to presenting, automatically presenting a previously identified risk associated with one or both of an audit area and a transaction class associated with a subset of the plurality of internal financial control items; (g) receiving a user test input designating an internal financial control item for testing and presenting a set of test procedures associated with the designated internal financial control item; (h) documenting assessments with the set of test procedures; (i) receiving from a user a plurality of inputs representing user assessment of the effectiveness of internal financial control items and presenting a summary of the effectiveness assessments; (j) receiving a set of user inputs adapted to designate at least some of the plurality of internal financial control items as having a key control status; (k) assigning and presenting a set of defaults designating at least some of the plurality of internal financial control items as having a key control status and allowing a user to change key control status designation; and (l) filtering internal financial control items based on a key control status designation assigned to a subset of the plurality of internal financial control items and presenting the subset of the plurality of internal financial control items having the key control status designation.

In another embodiment, the present invention provides a system for assessing risks associated with internal financial controls. The system includes: a computer having an associated memory, display, and input device and adapted to execute code; a graphical user interface adapted to operate on the computer and adapted to present a plurality of internal financial control items, the graphical user interface further adapted to receive user inputs related to the set of internal financial control items via the input device; and a code set adapted to be executed on the computer and adapted to process the user inputs to generate a set of assessment information based on the received user inputs.

In another embodiment, the present invention provides a computer-implemented method for assessing a plurality of internal control items. The method includes: (a) automatically grouping and presenting a subset of internal control items based on an assessment of risk associated with one or more internal control items included in the subset of internal control items; (b) processing a set of inputs associated with at least some of the subset of internal control items; and (c) generating a set of assessment information based on the processed set of inputs. The internal control items may relate to one or more of compliance, operational, financial, and regulatory controls.

The present invention builds on existing practice aids to provide an integrated audit planning and risk assessment approach to engagements. The invention provides an audit tool that allows auditors to complete audit planning documentation, identify and capture audit risks affecting the engagement, provide a risk-based approach to presenting internal controls information to users integrated with and responsive to auditor risk assessments, customize aspects with user-friendly GUI and drag and drop functionality, and produce tailored practice aids for the engagement. To a large extent the present invention may be used to automate the audit planning and internal control assessment process, optimize judgments, improve linkage between audit risk and internal controls, increase audit effectiveness and reduce risk, and increase consistency across audit engagements. These and other objects and benefits of the present invention are made more apparent with the aid of the following description and figures.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference, and are as follows:

FIG. 7 depicts a screen shot illustrating exemplary control environment functionality for presenting control deficiency functionality in conjunction with the present invention;

FIG. 20 a screen shot illustrating exemplary diagnostics functionality for use in conjunction with the present invention.

DETAILED DESCRIPTION OF THE PREFERRED EMBODIMENT

Figure 1:
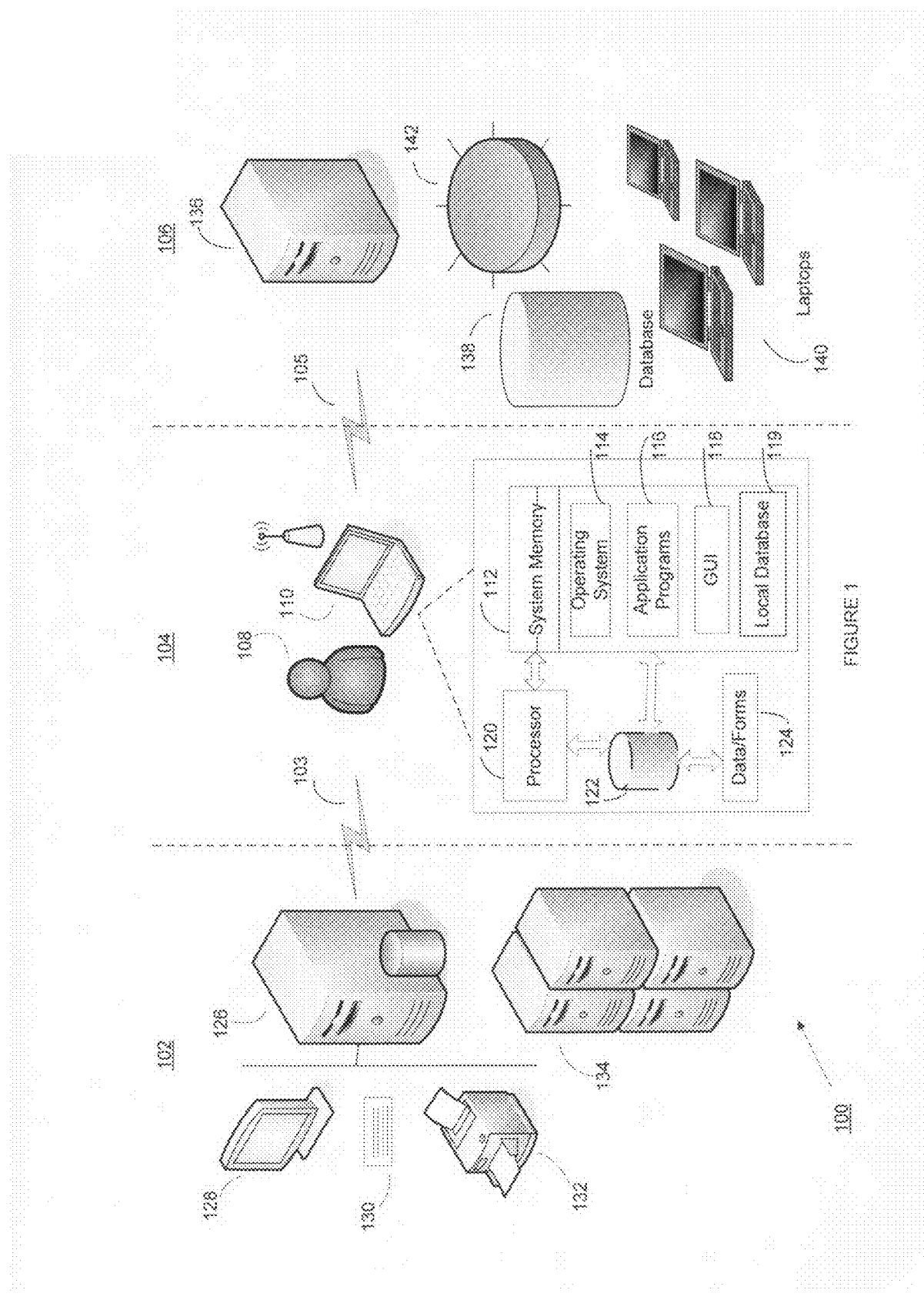
FIG. 1 depicts an exemplary system embodiment of the present invention.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

In one respect, the invention provides a professional services audit tool that includes an application that performs a variety of functions such as completing certain audit planning processes/forms (including assessing risks related to the financial statements being audited), offering a tailored set of audit programs based on the assessed risks, allowing users to further tailor the suggested audit programs, and rendering these audit programs in a helpful format, e.g., Thomson Corporation's PPC SMART e-Practice Aids format. In one manner, to use the application, each user also must own and have a valid license installed of an associated "practice aid," e.g., Thomson's e-Practice Aid product. In this example, the practice aid corresponds to one of eleven audit types, also referred to herein as "titles." An exemplary list of audit types or titles that are supported by the Risk Assessment system of the present invention includes: Guide to Audits of Nonpublic Companies; Guide to PCAOB Audits (i.e., audits of publicly-traded companies); Guide to Audits of Nonprofit Organizations; Guide to Audits of Local Governments; Guide to Audits of Employee Benefit Plans; Guide to Construction Contractors; Guide to Dealerships; Guide to Audits of Financial Institutions; Guide to Homeowners' Associations and Other Common Interest Realty Associations; Guide to HUD Audits; and Guide to Single Audits (audits that comply with government and non-profit "single audit" rules, regulations and guidelines). One advantage of this embodiment of the invention is that it enables a user to obtain a greater understanding of the entity under audit or review and its environment, review internal control, perform a more rigorous risk assessment, provide linkage of assessed risks of material misstatement (RIMM) to the user's audit procedures at the assertion level, and meet new and expanded documentation requirements.

As used herein, controls or control procedures shall refer to internal control procedures, including internal accounting control procedures, including the procedures that management has adopted or devised to provide management with some degree of assurance that the objectives of the accounting information system will be achieved. A control risk is the risk that a material misstatement will not be detected or prevented by the entity's internal control on a timely basis. COSO refers to Committee of Sponsoring Organizations of the Treadway Commission, which issued a report titled Internal Control-Integrated Framework (the COSO Report). The COSO Report has increasingly become a widely accepted framework for sound internal control among U.S. entities. Identified risk refers to a risk discovered in an engagement that could result in material misstatement of the financial statements. Internal Control refers to a process, effected by an entity's board of directors, management and other personnel, designed to provide reasonable assurance regarding the achievement of objectives, specifically in the following categories: Efficiency and effectiveness of operations; Reliability of financial reporting; and Compliance with applicable laws and regulations. Objectives are goals of the audit intended to mitigate the Control Risks. A single Objective could mitigate one or more Control Risks. Test Procedures or Tests of Controls refers to those activities performed by the auditor during the control testing stage that gather evidence as to the operational effectiveness of internal control procedures upon which the auditor has planned reliance. A transaction class represents a class of transaction within a Financial Reporting Cycle.

Referring now to FIG. 1, a system 100 is shown for implementing an internal control assessment and testing program and providing a tool that creates and generates procedures based on risk assessments and assertions identified during an audit. The system 100 comprises a central side 102, a remote audit work station 104 and a local client-side facility 106. In this example, a user 108, such as a professional conducting an audit, may use a mobile or local device, such as a wireless-enabled notebook computer 110 to connect to the central side 102 and/or the client side 106 via communication links. This configuration is one of many and is not limiting as to the invention. For example, in one alternative configuration user 108 may use the application fully self-contained within a desktop environment, e.g., as shown within 104, and may utilize a local database 119, such as SQL 2005 or above or SQL Express or other suitable database. The communication links may be a combination of wireless, LAN, WLAN, ISDN, X.25, DSL, and ATM type networks, for example. The user notebook 110 may comprise a typical combination of hardware and software including system memory 112, operating system 114, application programs 116, graphical user interface (GUI) 118, processor 120, and storage 122 which may contain electronic information 124 such as forms, practice aids, titles, data, procedures and the like. The operating system 114 shall be suitable for use with the internal control assessment functionality described herein, for example, Microsoft Windows Vista (business, enterprise and ultimate editions), Windows 2000 with SP4 or Windows XP Professional with SP2. Also, the risk assessment invention may be browser-based and/or may include custom integration with Microsoft Office applications, e.g., Outlook, Word and Excel. Application programs 116 may include, for example, Microsoft Office 2007, Office XP with SP2, or Office 2003 with SP1 applications. The software and related tools, procedures, forms and data used to implement the internal control assessment and testing processes may be accessed by the machine 110 via the Internet or it may be loaded onto the machine via CD-ROM or other media or a combination of such means. The system requirements in one embodiment may require the machine 110 to be compatible with minimum threshold levels of processing capabilities, e.g., Intel Pentium III, speed, e.g., 500 MHz, and other parameters.

For purposes of discussion, an exemplary central side 102 may comprise a central server and database 126, user interface peripherals such as drives (not shown) monitor 128, keyboard 130, and printer 132. The central server and database 126 may be used to communicate remotely, or locally for that matter, with the user's machine 110 and may load, pass, receive information and instructions, such as software executable on the machine 110 and data, forms, titles, guides, procedures and the like for storing and using locally by the user on machine 110. A communication link 103 may be established between central side 102 and user workstation 104 for updating data and software used by the user during auditing processes. The central side 102 may also include one or more application servers 134 and other devices to help facilitate the exchange of software and data between the user 108 and the central side 102. The central side 102 may be associated with a professional services company, such as an accounting firm, in the business of conducting audits.

The local client-side facility 106 is illustrated for exemplary purposes only as including a server 136 or the like to provide a communication link 105 between the user machine 110 and the client-side system as required, if at all, in the auditing process. The client-side facility 106 may include a network 142 of computers 140, such as over a LAN, WLAN, Ethernet, token ring, FDDI ring or other communications network infrastructure. The client-side facility may also include a database 138 or other data storage component. In conducting an audit of a company associated with facility 106, the user 108, in one optional manner, may access data and/or the network 142 as necessary to review documents and processes of the company to prepare assessments and identify control risks associated with company operations. In conducting and completing the audit engagement, the user 108 inputs data, calls upon audit tools, such as titles and procedures stored locally or remotely at the central side 102.

The system 100 may be Internet or (World Wide) WEB-based, desktop-based, or application WEB-enabled. Also, the present invention supports a "disconnected use" of the software in that the software may be designed so that a user 108 does not write back to the central server database 126 and/or the local database 119 until the user chooses to "save" or store the changes. Prior to saving changes, the user 108 may work in short-term memory. This feature has the benefit of allowing the user 108 to perform "what if" scenarios and examine results of these scenarios.

Figure 3A:
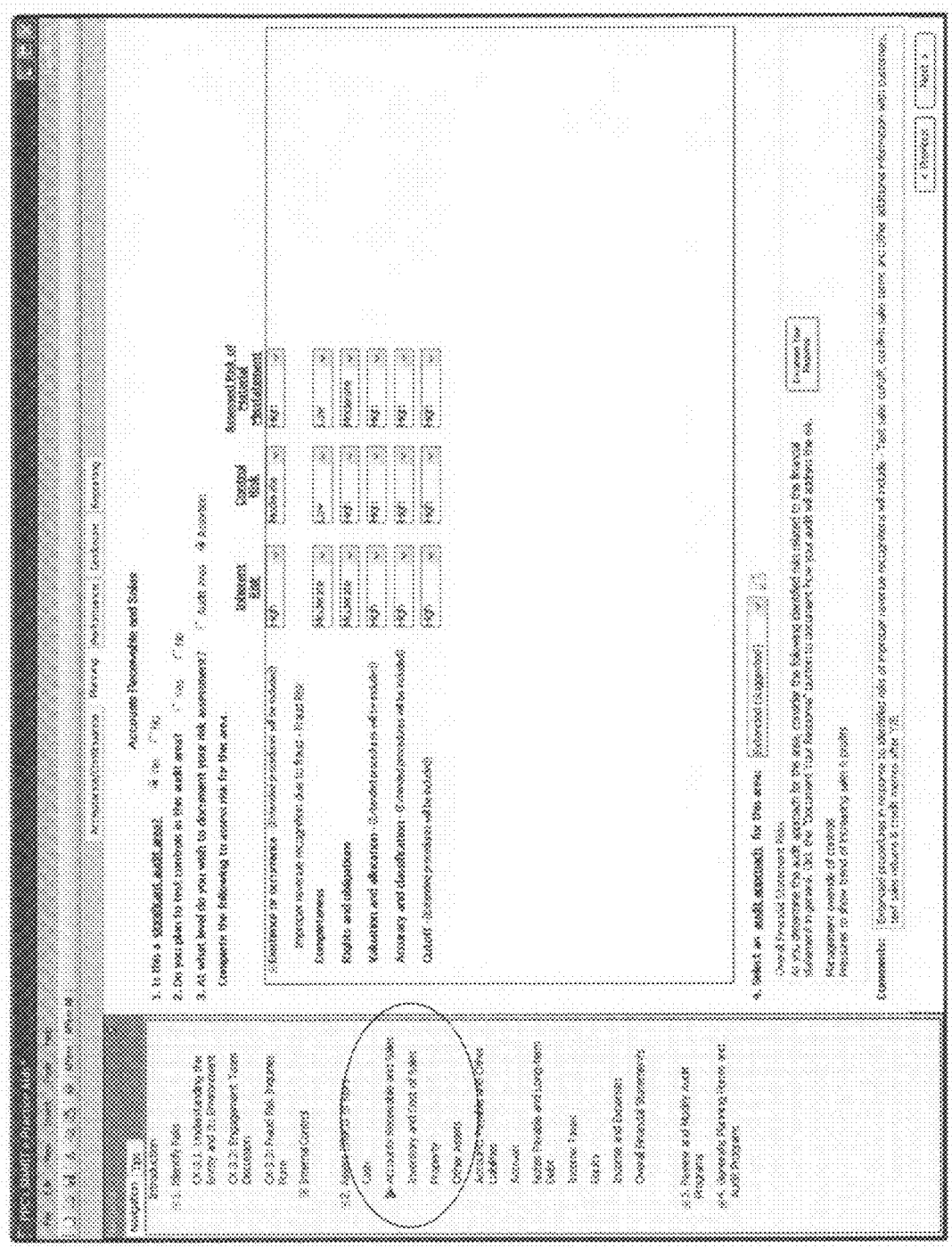
FIG. 3A depicts a screen shot illustrating exemplary functionality for use in conjunction with the present invention.
Figure 3B:
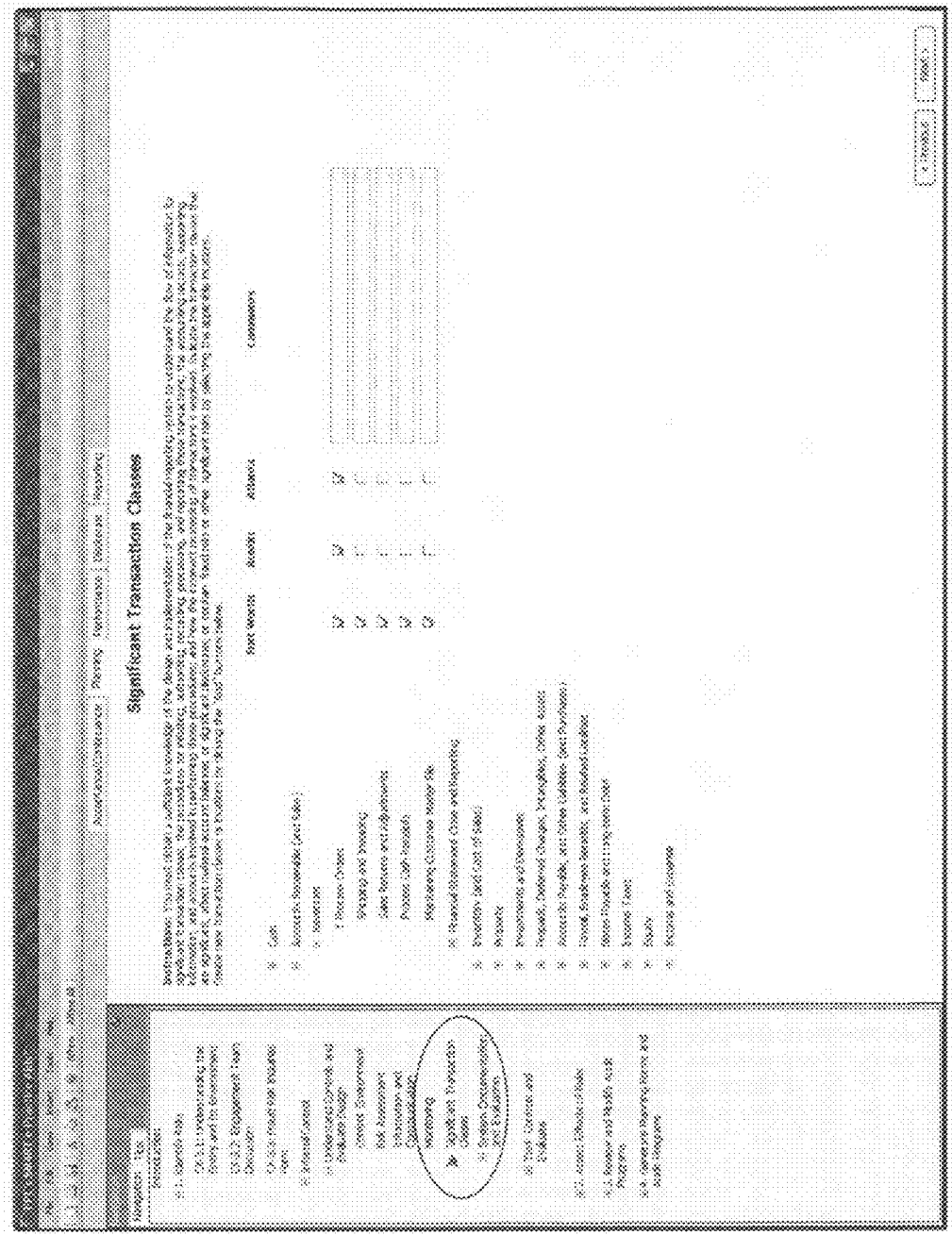
FIG. 3B depicts a screen shot illustrating exemplary significant transaction classes functionality for use in conjunction with the present invention.

With reference to FIGS. 3A and 3B, the internal control assessment invention may be invoked as part, e.g., software module, of an over all audit suite of audit practice software tools, e.g., Thomson's SMART e-Practice Aids. The internal control module may be integrated within the suite of tools and call on data or assessments, such as risk assessment, contained in a collective database or associated with the other modules. The internal control assessment module obtains and documents a user's understanding of internal control through narratives and selection of controls from a database of controls. The user may select controls to test and generate test procedures or programs. Another aspect of the invention allows a user to evaluate design and operating deficiencies in the internal controls implemented by the entity being audited. In this manner, the user may assess control risks within the entity's internal control practices.

As a prelude, an audit engagement, new or existing, is selected as an initial part of an audit process. At FIG. 3A, the "planning" tab of an exemplary "SMART e-Practice Aids" solution is selected to gain access to multiple functions, including the "Internal Control" function. Audit areas and transaction classes are terms and items of the audit that are common across the suite and information collected and assessments made in conducting other functions of the suite may be used by the internal controls function as well. FIG. 3A also represents an assessment of risks associated with the accounts receivable and sales audit area and identifies assertions related thereto. FIG. 3B depicts a significant transaction classes screen under the internal control module's understanding controls and evaluate design feature.

Figure 4:
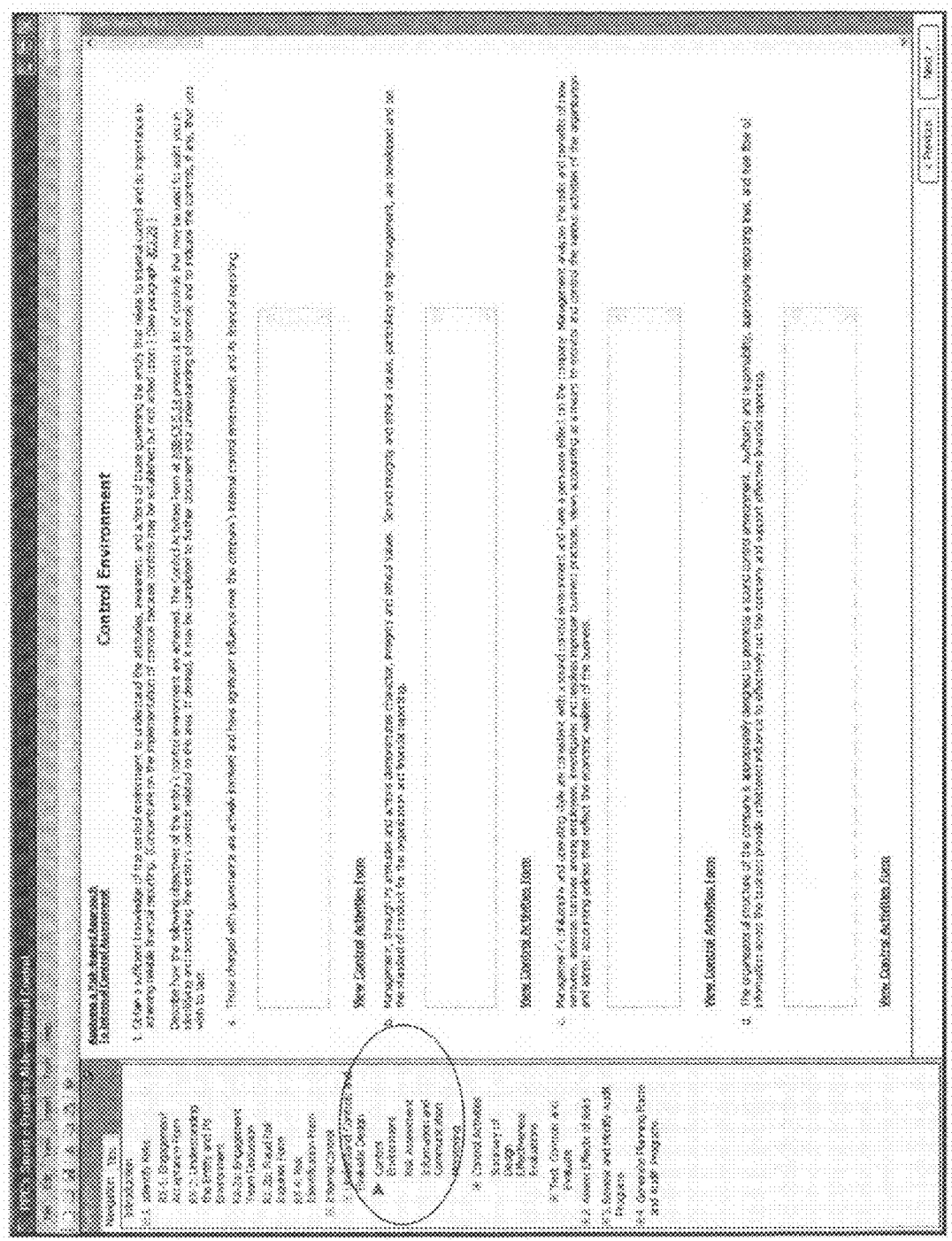
FIG. 4 depicts a screen shot illustrating exemplary control environment functionality for use in conjunction with the present invention.

FIG. 4 depicts a screen shot illustrating exemplary control environment functionality for use in conjunction with the present invention. The following internal control components are derived from COSO: control environment; risk assessment; information and communication; monitoring; and control activities, as represented on the left side of the screen. From this screen, a user may click on "view control activities" button to view the list of internal control items grouped by objective, in this case objective "a" as shown on FIG. 4.

Figure 5:
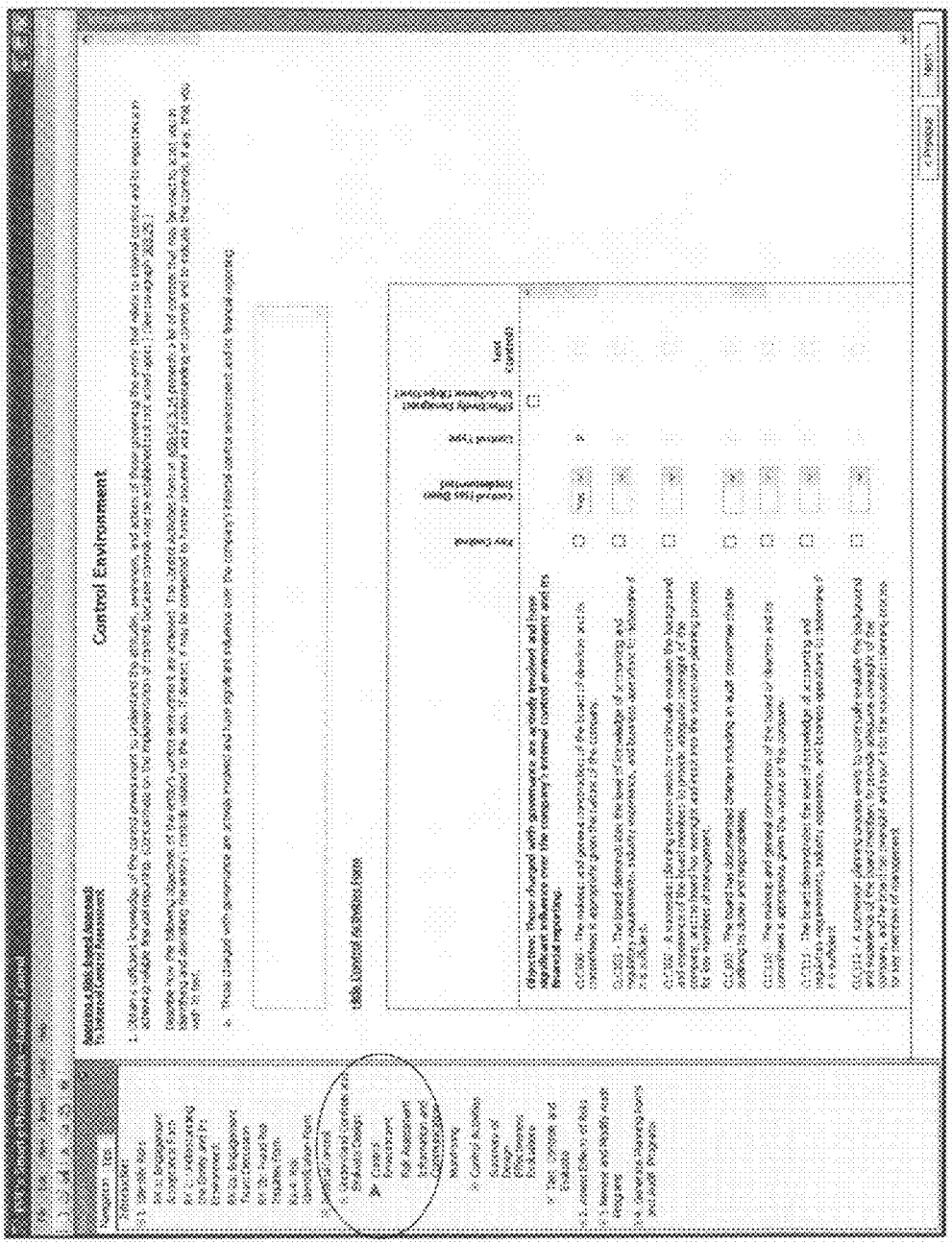
FIG. 5 depicts a screen shot illustrating exemplary control environment functionality for presenting internal control items grouped by control component in conjunction with the present invention.

FIG. 5 depicts a screen shot illustrating exemplary control environment functionality for presenting internal control items grouped by control component and objective. From this screen, a user may be presented, as will be seen hereinafter, with an exclamation point to indicate the existence of a risk associated with one or more of internal control component, objective, audit area, transaction class, internal control item, for example. As shown in FIG. 5, a user may make an assessment of design effectiveness and log or enter the assessment using the box provided. The user may also indicate one or more control items for testing using the appropriate boxes provided next to each presented internal control item, e.g., CLC100-CLC112.

Figure 6:
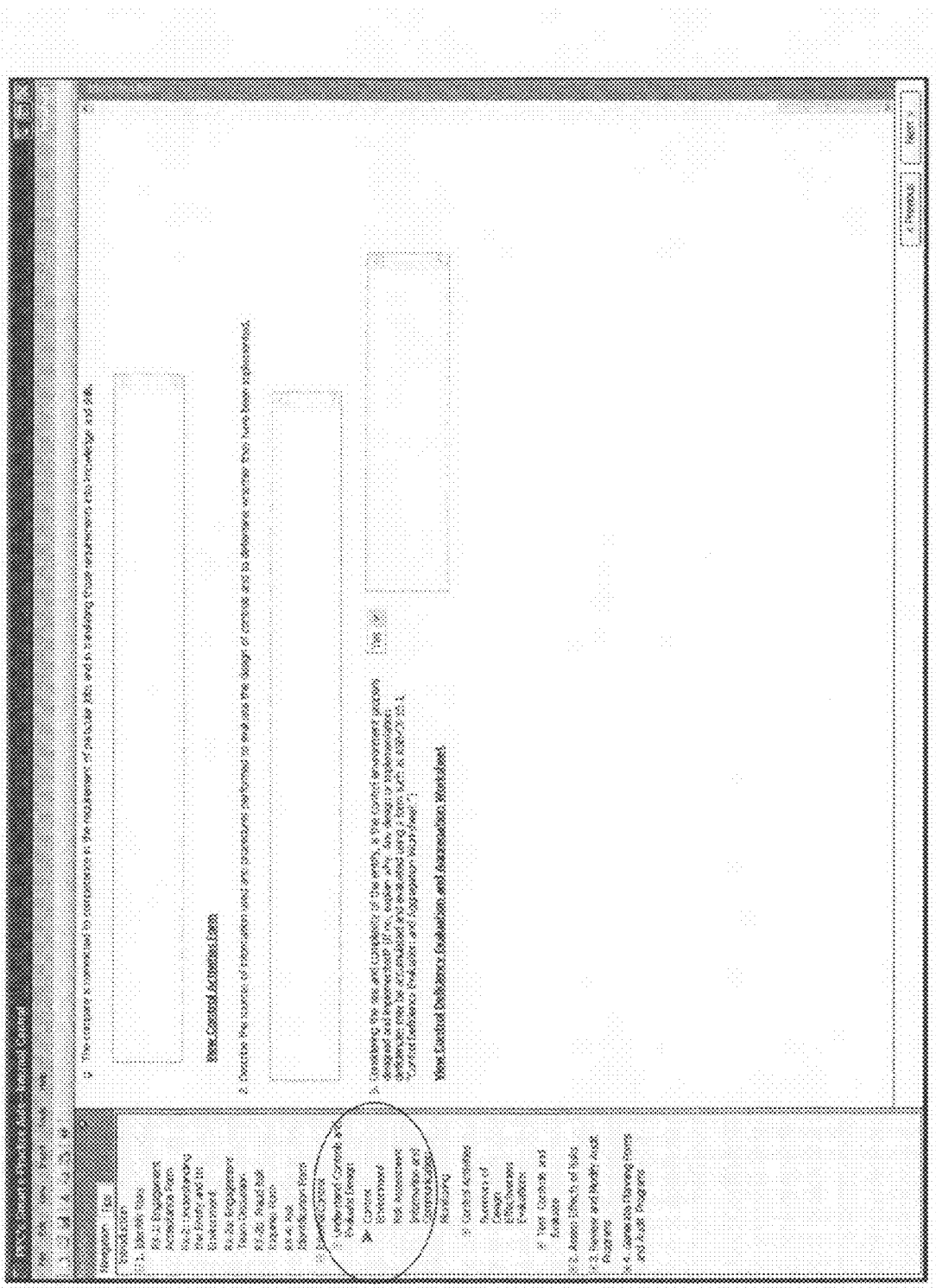
FIG. 6 depicts a screen shot illustrating exemplary control environment functionality for presenting control deficiency functionality in conjunction with the present invention.
Figure 7:
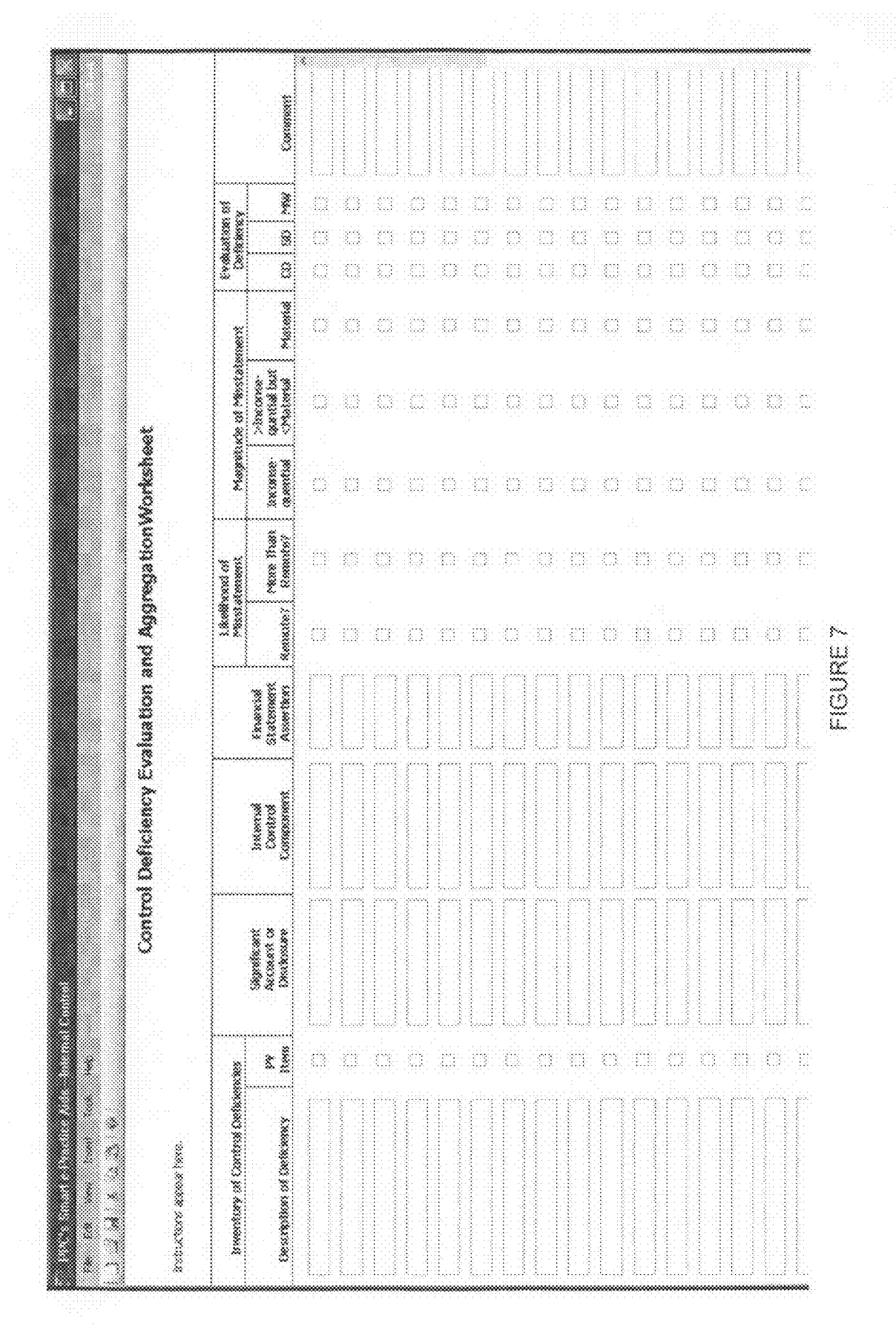

FIG. 6 depicts a screen shot illustrating the rest of the exemplary control environment screen. In particular, FIG. 6 presents to a user a button for invoking the control deficiency evaluation and aggregation worksheet function for use in conducting the audit, testing and evaluation of internal controls. A box is provided for receiving user inputs related to the various items as indicated, for example logging assessed and identified design or control implementation deficiencies. Logged deficiencies are then aggregated and presented to the user using the control deficiency evaluation and aggregation worksheet depicted at FIG. 7.

Figure 8:
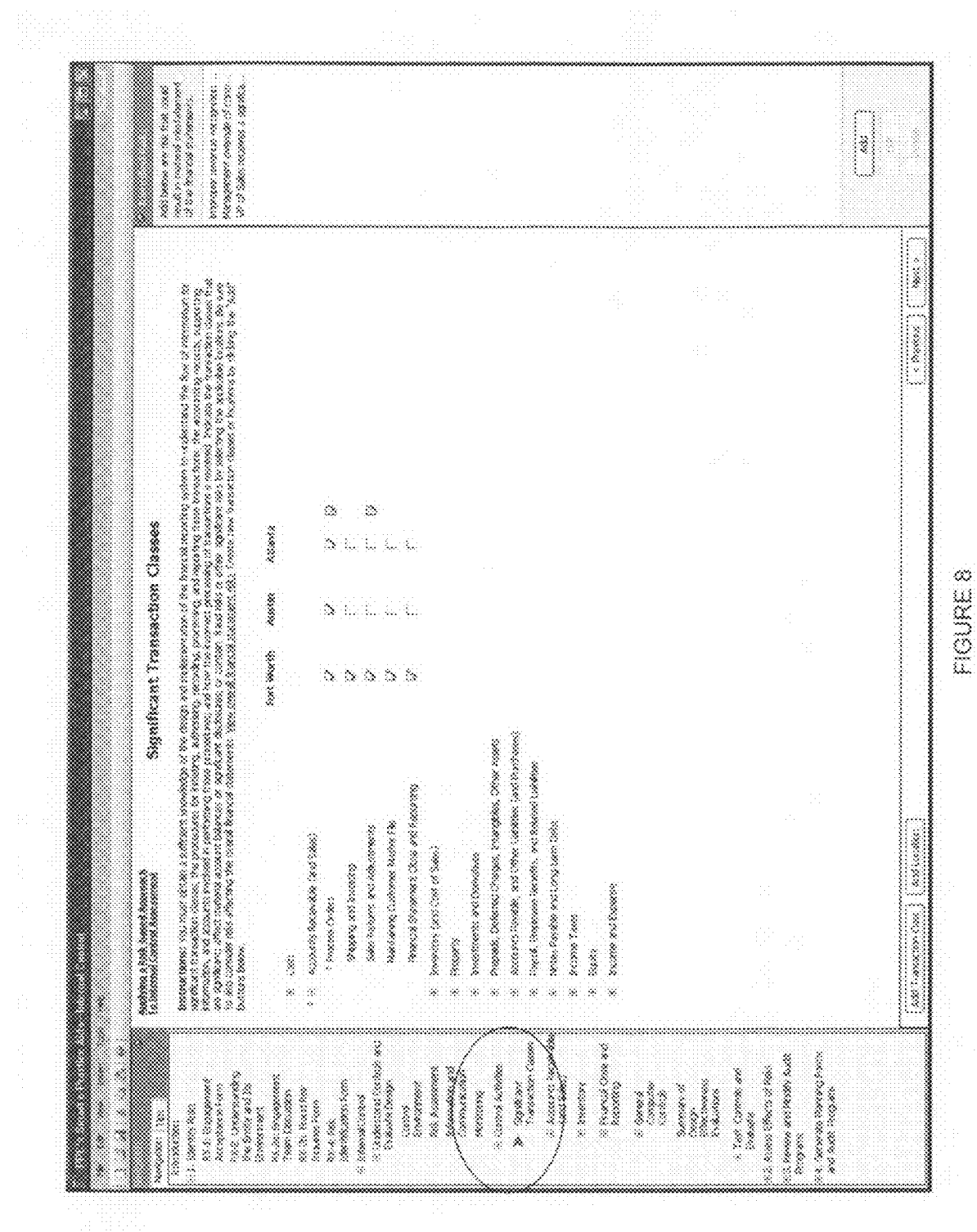
FIG. 8 a screen shot illustrating exemplary significant transaction classes functionality for use in conjunction with the present invention.
Figure 9:
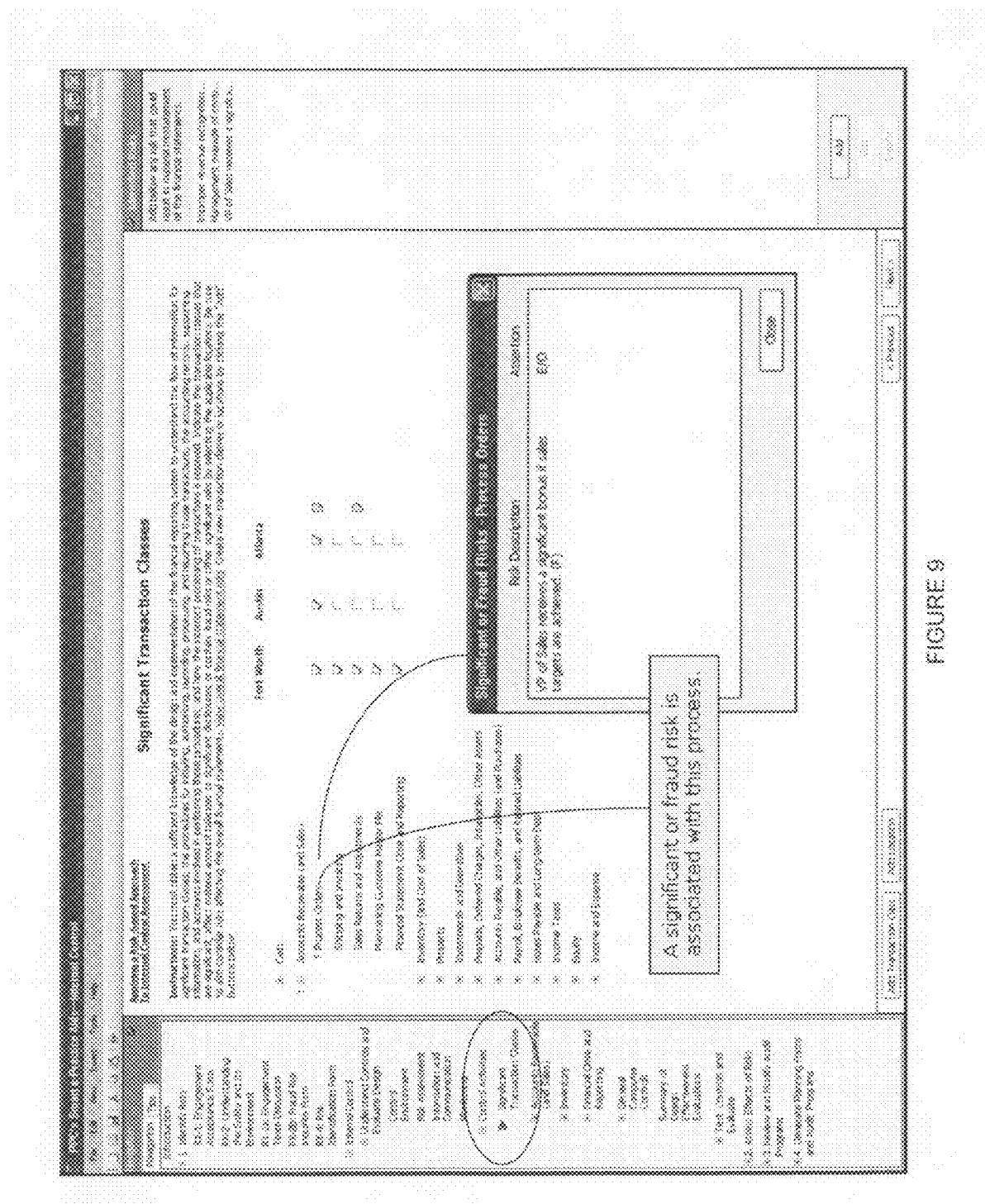
FIG. 9 a screen shot illustrating exemplary significant transaction classes functionality for use in conjunction with the present invention.

FIG. 8 is a screen shot illustrating exemplary significant transaction classes functionality for use in conjunction with the present invention. At this screen, as invoked by clicking on the button on the left hand side of the navigation bar, a user is presented with transaction classes, e.g., process orders, shipping and invoicing, sales returns and adjustments, etc., as grouped by audit area, e.g., cash, accounts receivable, inventory, property, etc. Audit areas include line items that appear on financial statements and are also associated with a risk assessment operation of the audit. As shown, exclamation marks represent and indicate previously identified risks, such as in performing the risk assessment operation of an audit, and are helpful in driving a risk-based approach to control risk assessment. For instance, and as shown in FIG. 9, by hovering a cursor over the exclamation mark or associated audit area or transaction class, a user is presented with the yellow box indicating the existence of a risk or by clicking a user is presented with, in this case, a pop-up window providing a description of the risk identified. By presenting the user with the information during the internal control assessment process, the system of the present invention drives a risk-based approach to the assessment and testing and evaluation processes.

Figure 10:
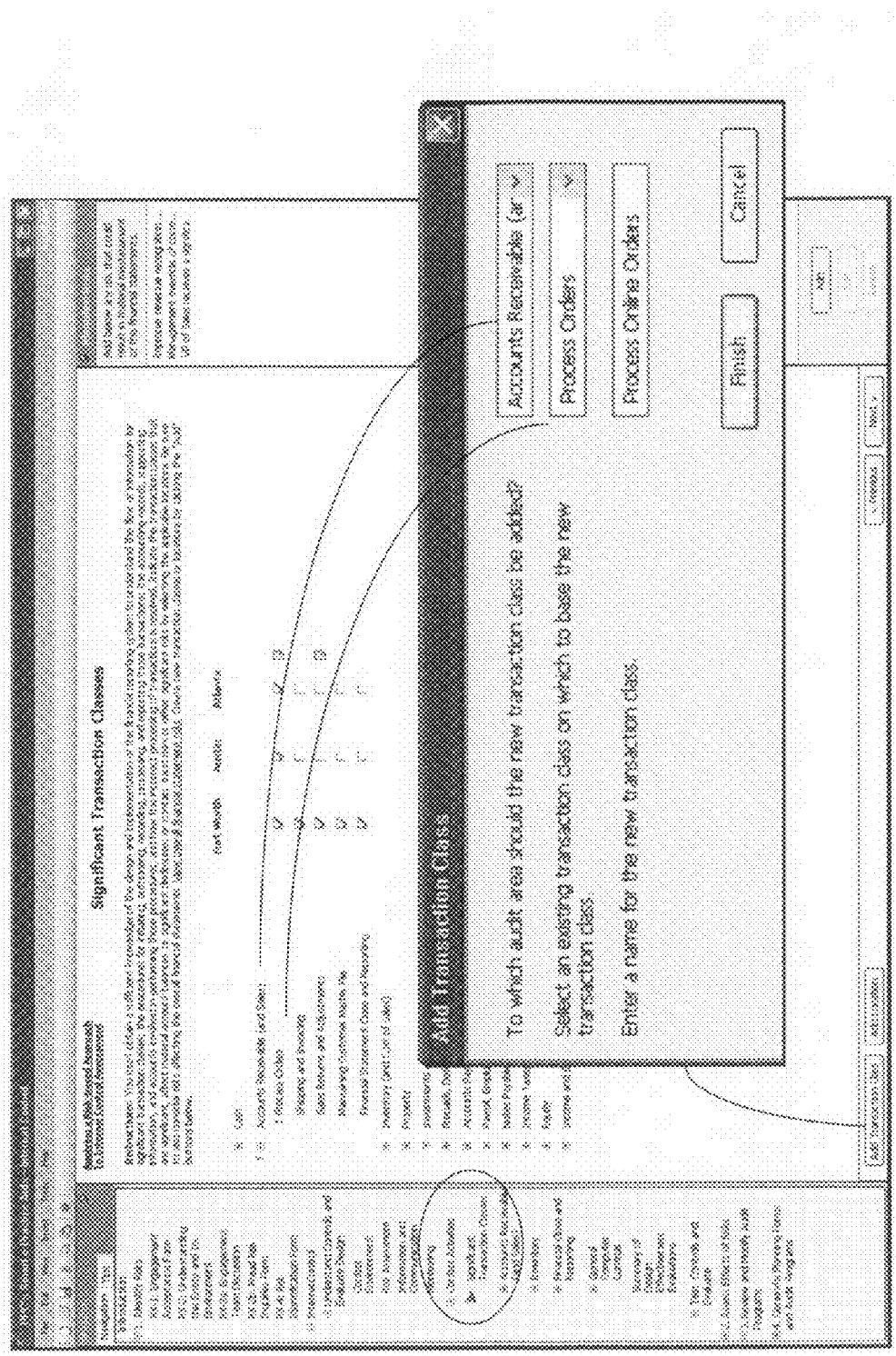
FIG. 10 a screen shot illustrating exemplary significant transaction classes functionality for use in conjunction with the present invention.
Figure 11:
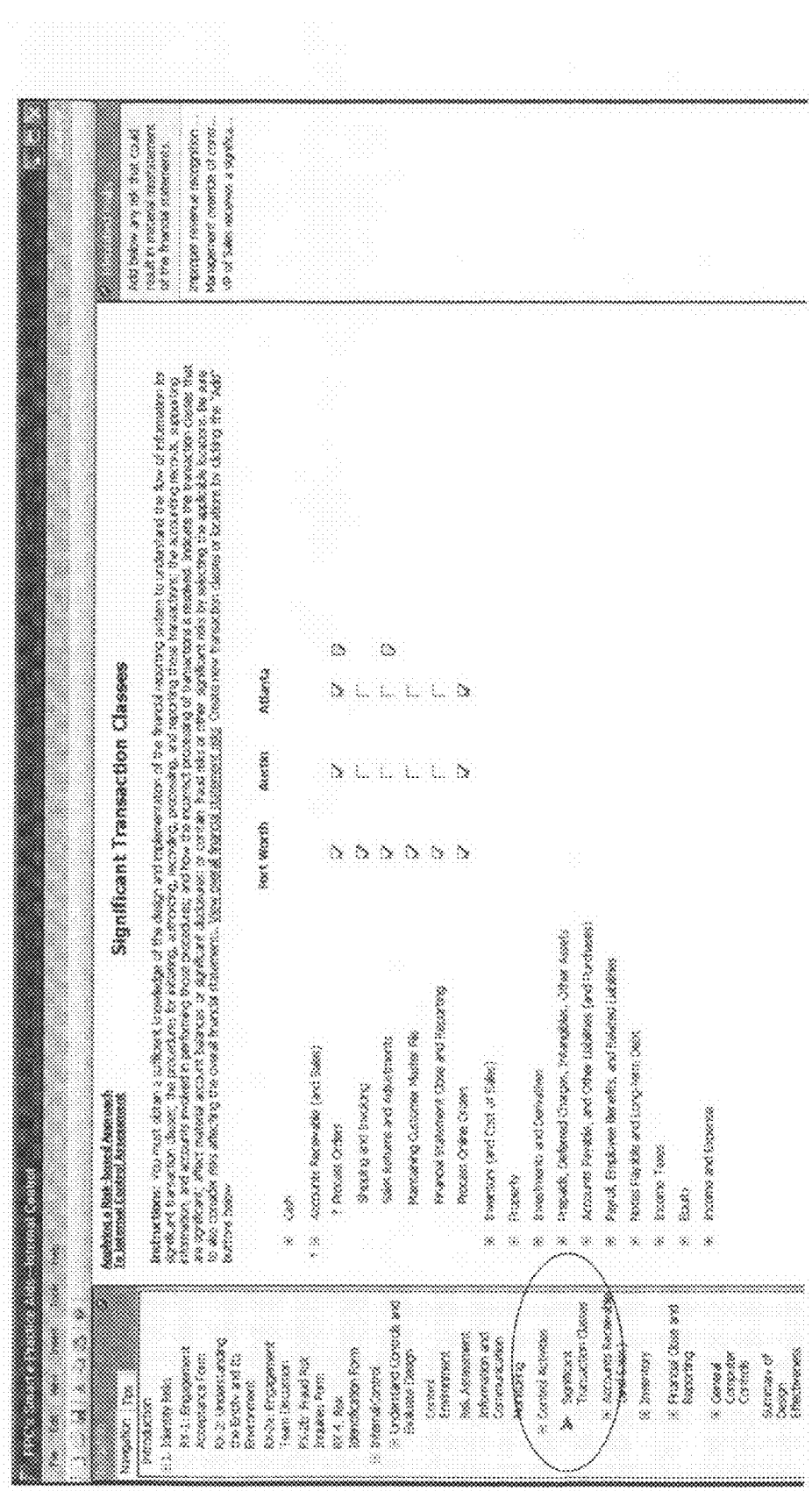
FIG. 11 a screen shot illustrating exemplary significant transaction classes functionality for use in conjunction with the present invention.

FIG. 10 is a screen shot illustrating exemplary significant transaction classes functionality for use in conjunction with the present invention. As shown, a user may add a transaction class by clicking on the add button. A window presents to the user for receiving user input and selection to define/select an additional transaction class. FIG. 11 shows the results of the "add" process of FIG. 9, in which "process online orders" was added as a transaction class and associated with the accounts receivable audit area. This process is under, as shown in the navigation bar, the COSO derived control component-Control activities.

Figure 12:
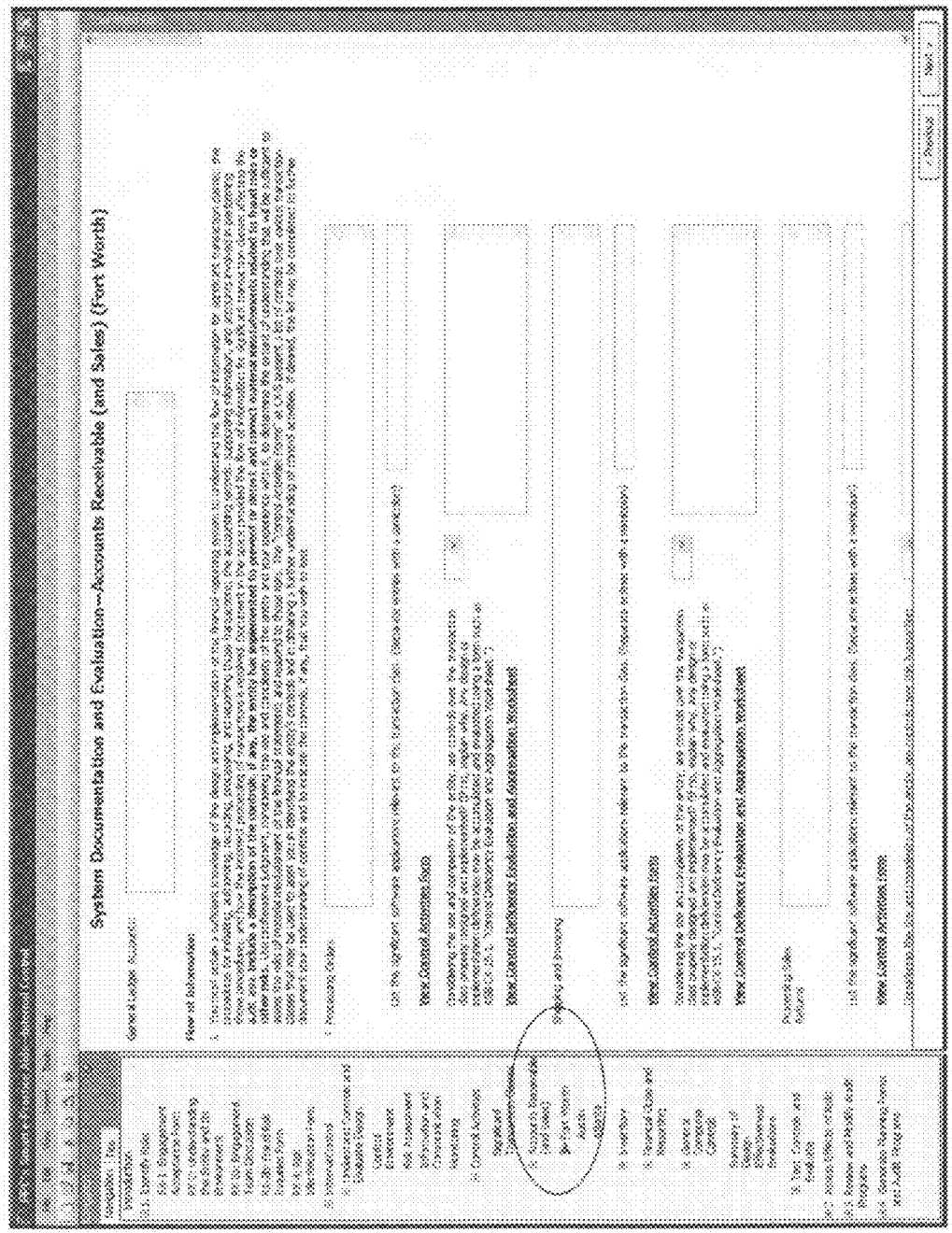
FIG. 12 a screen shot illustrating exemplary system documentation and evaluation related to accounts receivable audit area for use in conjunction with the present invention.
Figure 13:
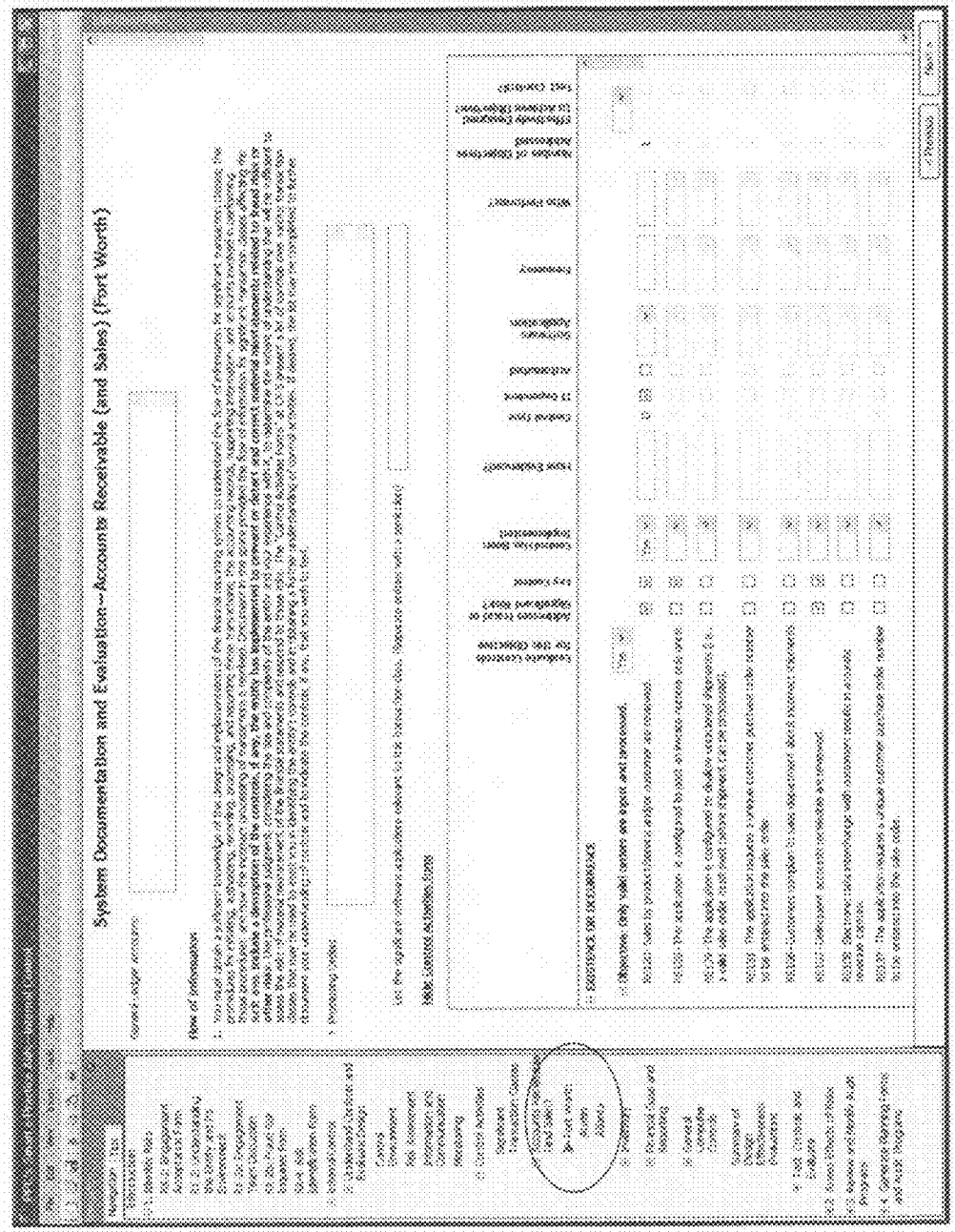
FIG. 13 a screen shot illustrating exemplary system documentation and evaluation related to accounts receivable audit area for use in conjunction with the present invention.

FIG. 12 depicts a screen and functionality associated with the system documentation and evaluation function and as shown related to accounts receivable audit area. This is also under the Control activities internal control component. From this screen, and as shown in FIG. 13, a user may reveal internal control items associated with and grouped by assertion and objective. This is also under the processing orders transaction class so the internal control items are also associated and grouped by transaction class. Further, this is under the accounts receivable audit area so the internal control items are also associated and grouped by audit area. As shown, the user is presented with boxes for logging deficiencies during the assessment process. The user inputs are aggregated in the summary of design deficiencies and design effectiveness summary as well as the previously discussed worksheet of FIG. 7. Also as shown, an exclamation mark indicates the existence of a known risk associated with the audit area and transaction class shown.

From the screen of FIG. 13, a user may indicate an assessment of design effectiveness, may indicate a desire to test certain of the listed control items and input other information, including selection of the control item as a "key control." The system may optionally define certain of the control items as "key control" items and this pre-selection may be overridden by the user or the system may not permit such an override. Again, by using a key control status associated with certain of the more critical control items, the system drives a risk-based approach to the internal control assessment process.

Figure 14:
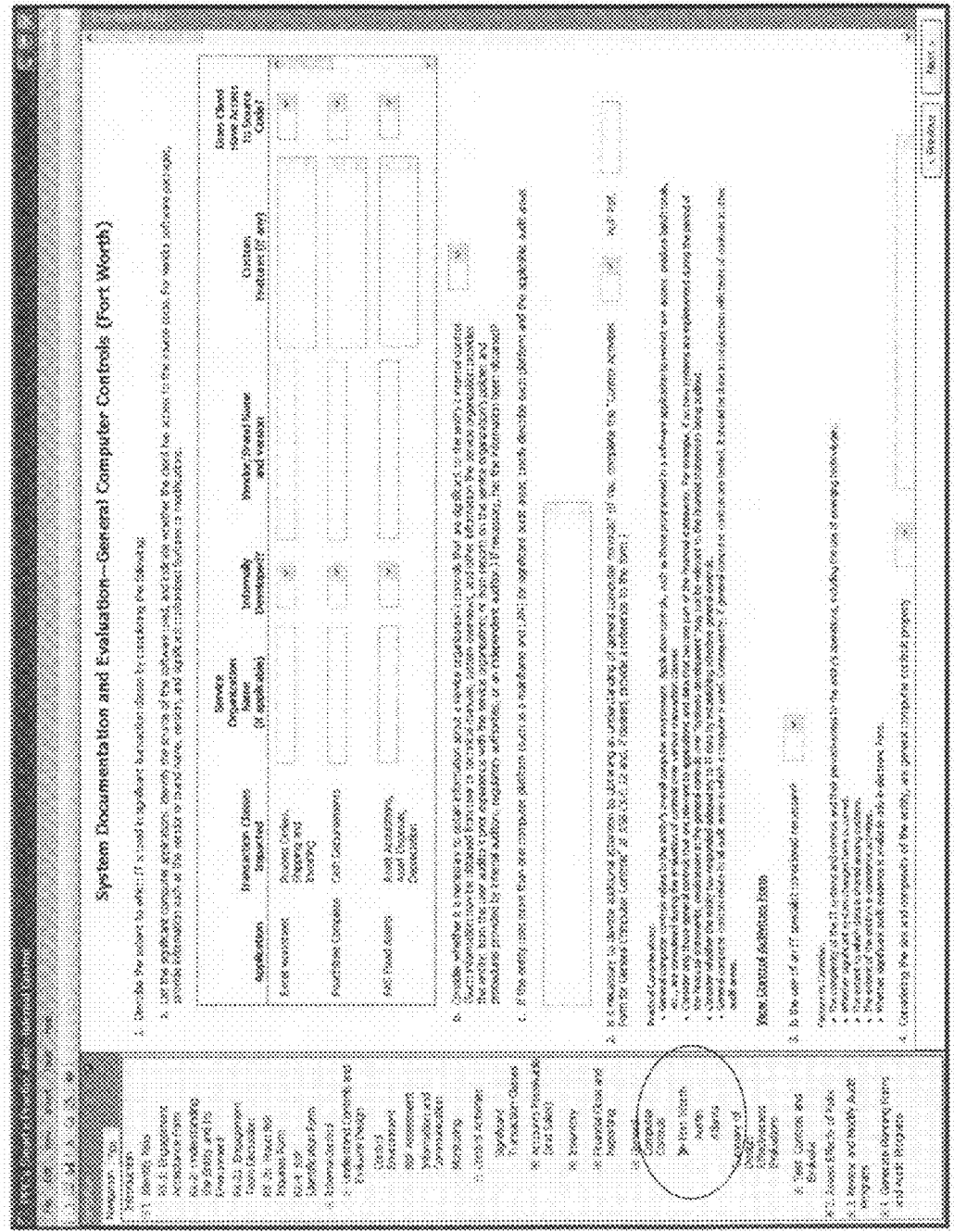
FIG. 14 a screen shot illustrating exemplary system documentation and evaluation related to general computer controls activities for use in conjunction with the present invention.

FIG. 14 provides a screen shot illustrating exemplary system documentation and evaluation related to general computer controls category under the control activities internal control component. This permits the user to input how information technology is implemented in the internal controls of the entity being audited and works largely as described hereinabove.

Figure 15:
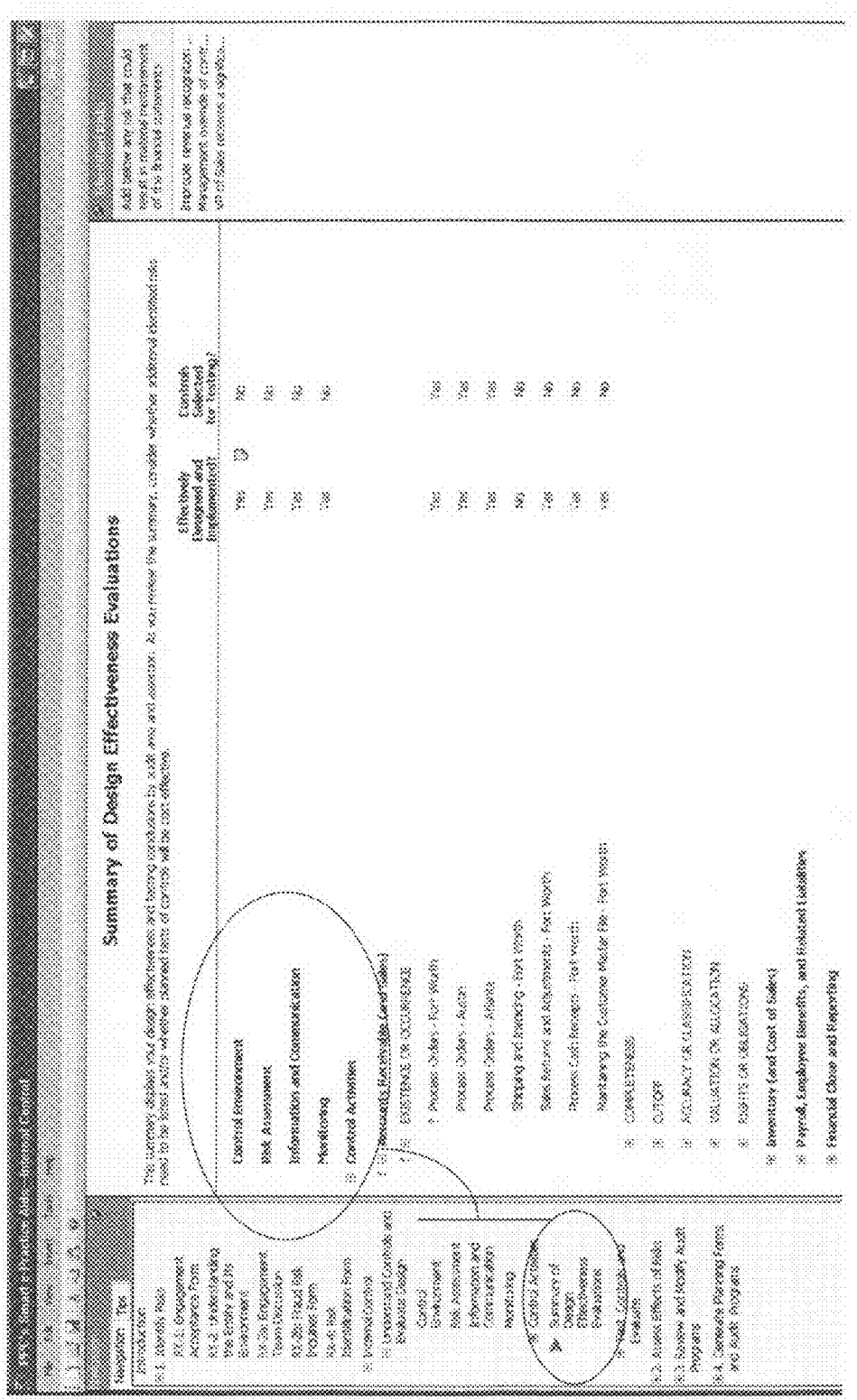
FIG. 15 a screen shot illustrating exemplary summary of design effectiveness functionality for use in conjunction with the present invention.
Figure 16:
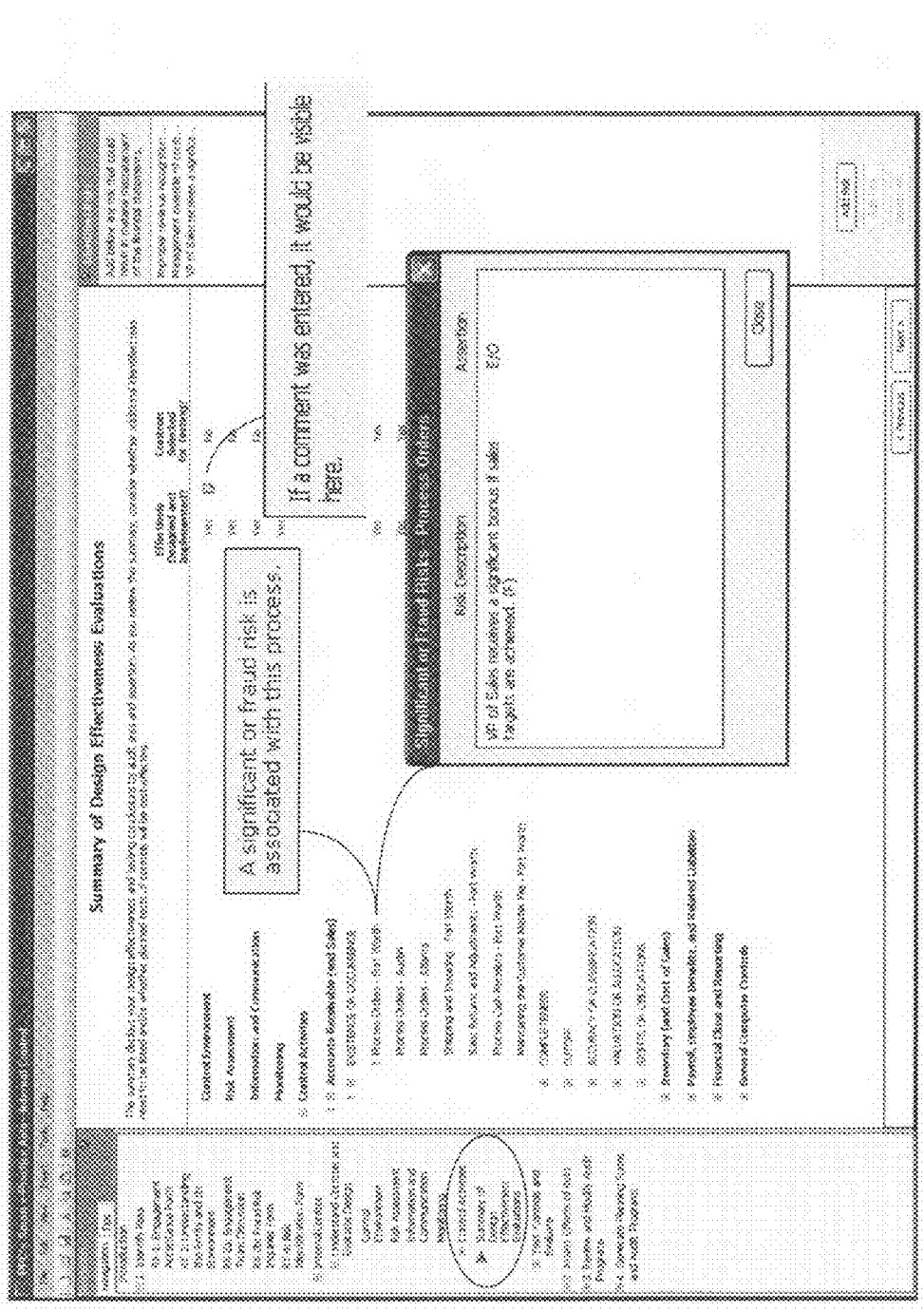
FIG. 16 a screen shot illustrating exemplary summary of design effectiveness functionality for use in conjunction with the present invention.

FIG. 15 depicts an exemplary summary of design effectiveness evaluation screen and associated functionality. As shown, there are five control components with one, control activities, highlighted. As shown audit areas and transaction classes are associated with the control component and indications of risk are presented to the user. Thus, the system drives a risk-based approach to the assessment of the internal controls. As shown, there are six assertions related to the accounts receivable audit area. The users previous inputs related to design effectiveness are displayed on the summary as are indications of the controls previously selected for testing. FIG. 16 illustrates additional functionality associated with this screen and as previously discussed that is available to the user.

Figure 17:
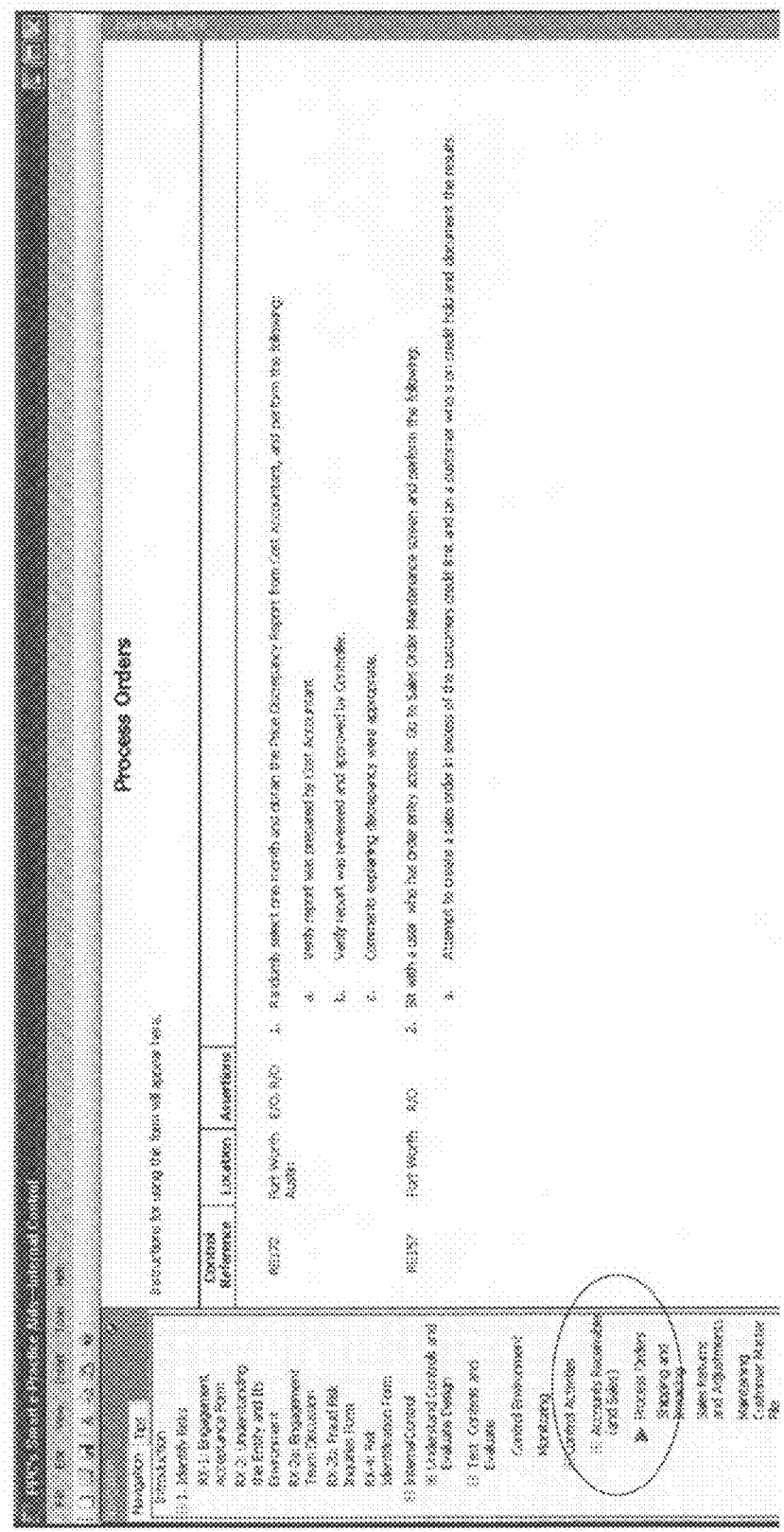
FIG. 17 a screen shot illustrating exemplary test procedures functionality for use in conjunction with the present invention.
Figure 18:
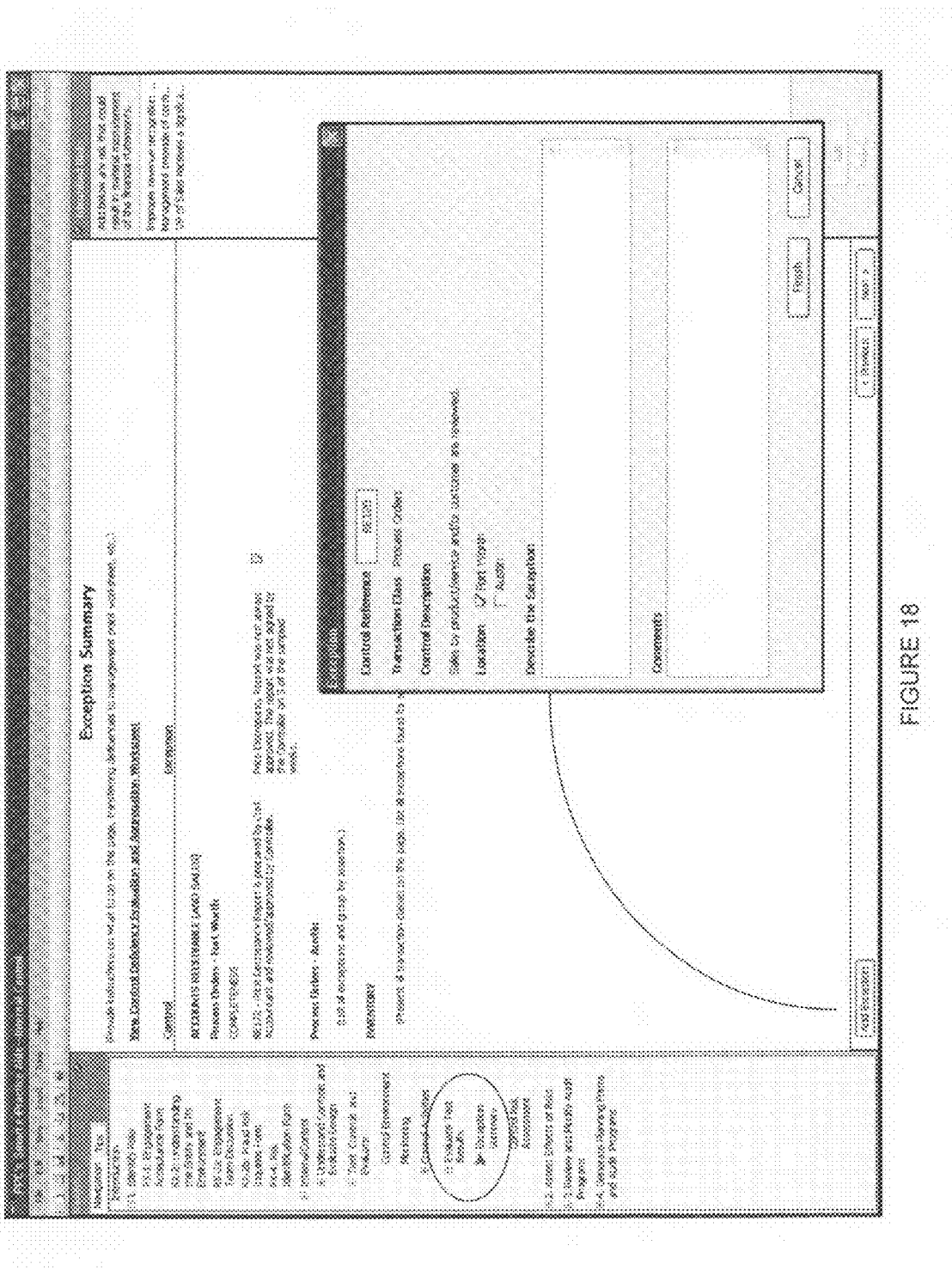
FIG. 18 a screen shot illustrating exemplary exception summary functionality for use in conjunction with the present invention.

FIG. 17 illustrates exemplary screen for presenting test procedures associated with certain control items, RE172 and RE157, to the user. Assertions are also displayed. The system may also provide the user with the ability to document results of test procedures and log the results into the system and generate associated work product and reports. FIG. 18 is a screen shot illustrating an exemplary exception summary. The user may use the system to note exceptions to implementation of certain internal control items and may use the summary to present the exceptions previously input for further consideration in the assessment process. As shown, a user may add additional exceptions into the system using the "add exception" button and window.

Figure 19:
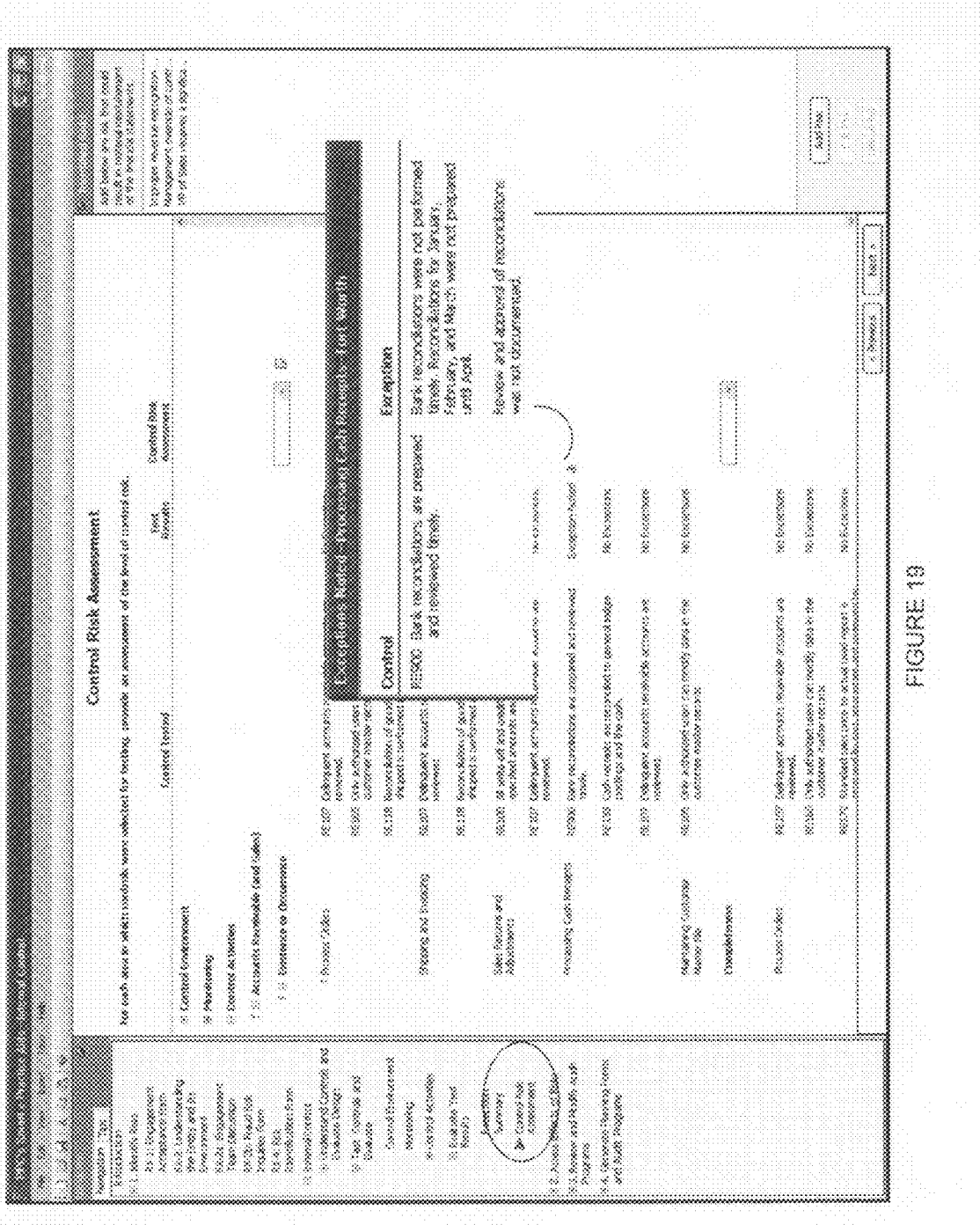
FIG. 19 a screen shot illustrating exemplary control risk assessment functionality for use in conjunction with the present invention.
Figure 20:
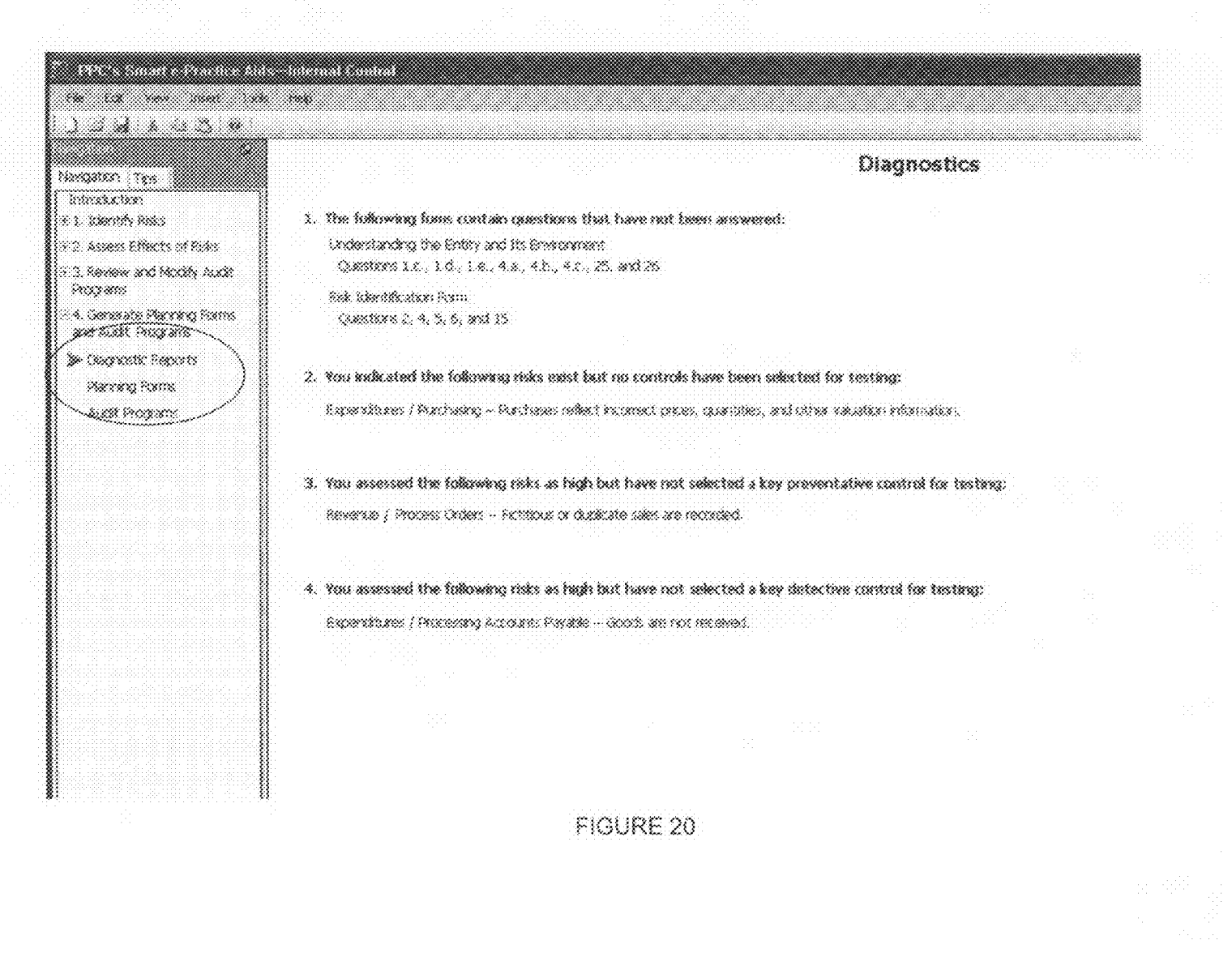

FIG. 19 is a screen shot illustrating exemplary control risk assessment page and functionality. As shown, under the control component "control activities" and audit area "accounts receivable", the user is presented with a list of assertions associated with therewith. As shown, a user may click on one of the noted exceptions to retrieve further explanation to aid in the assessment process. Control risk assessment pull downs are provide to collect the user's assessment of control risk associated with these areas. FIG. 20 is a screen shot illustrating exemplary diagnostics functionality and screen to present errors, inconsistencies and other issues relevant to the assessment process.

Figure 2:
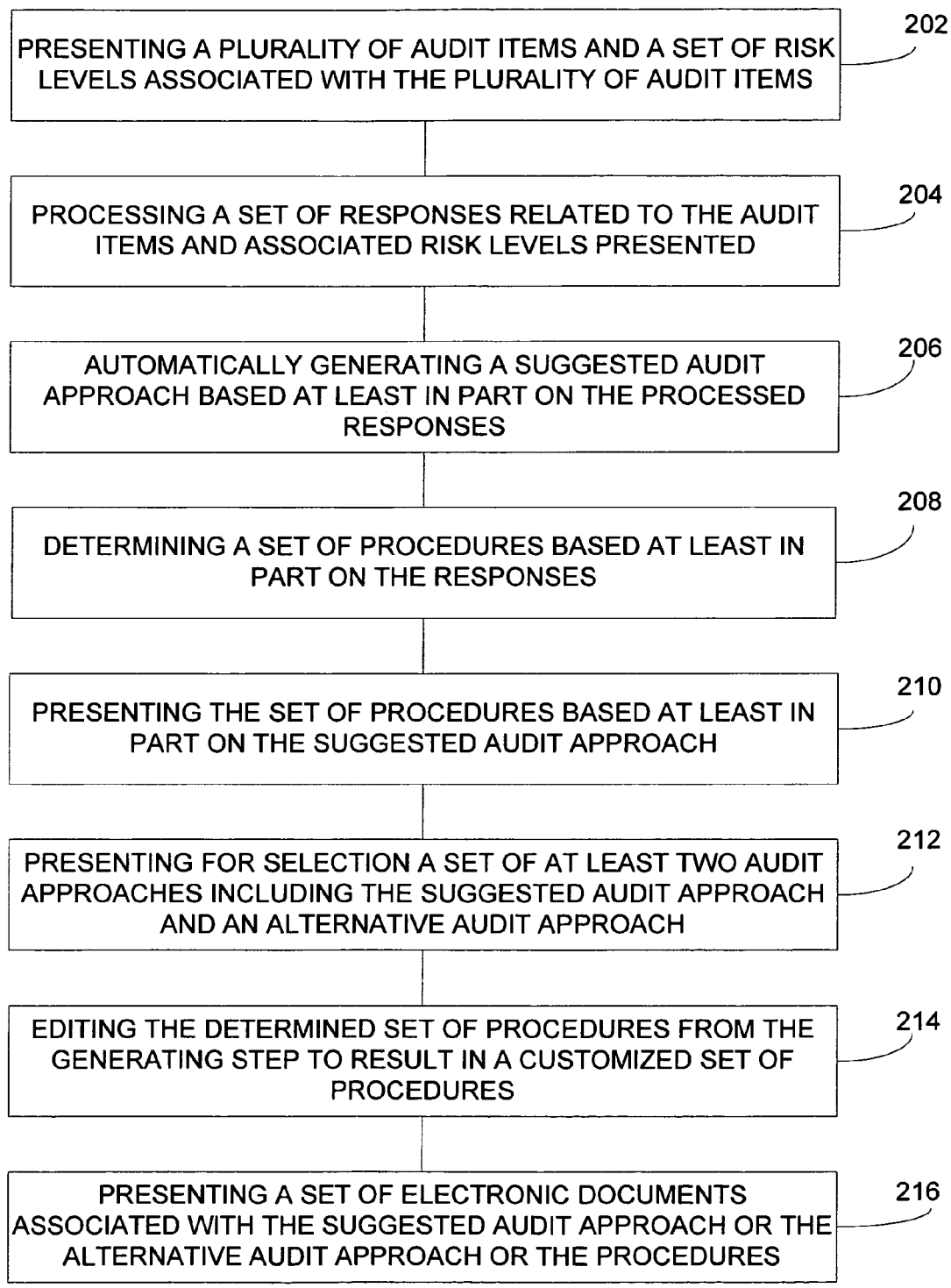
FIG. 2 depicts a flowchart illustrating one embodiment of the present invention.

FIG. 2 is a flowchart illustrating an embodiment of a risk assessment and audit process related to and that may be used in conjunction with the internal control system of the invention. A computer-implemented process 200 for assessing risks associated with an audit is shown. The process 200 includes the step 202 of presenting to a user a plurality of audit items and a set of risk levels associated with the plurality of audit items. Presenting step 202 may further comprise presenting a plurality of prompts designed to elicit a set of responses from a user/auditor wherein the set of user responses are associated with a set of risks associated with the audit. Further, the set of risk levels may be associated with a set of assertions associated with the plurality of audit items. Also, the set of risk levels may include at least a first risk level and a second risk level of different degrees of risk. Step 204 is processing a set of responses received from the user in response to the items presented in step 202. In step 206 the process automatically generates a suggested audit approach that is based at least in part on the processing step 204.

Still with reference to FIG. 2, the process 200 may optionally include one or more of the following steps. In step 208, the process includes determining a set of procedures that are based at least in part on the responses from step 204. At step 210, the set of procedures are presented to the user based at least in part on the suggested audit approach of step 206. The process may also include step 212 whereby a user is presented a set of at least two audit approaches comprising the suggested audit approach and an alternative audit approach from which the user may select. In addition, the suggested audit approach may be one of basic, limited or extended. In the process 200, each response in the set of responses may be a selected risk level from the set of risk levels representing different levels of risk. The presenting step 206 may include presenting an electronic audit form associated with the audit being performed by a user. The electronic form may comprise the plurality of audit items and the set of risk levels. The automatically generating step 206 may further include determining a set of procedures based at least in part on the set of user responses and the suggested audit approach may include presenting the set of procedures. The process 200 may also include step 214 of editing the determined set of procedures from the generating step 206 to result in a customized set of procedures. The process 200 may also include step 216 of presenting a set of electronic documents associated with the suggested audit approach.

The process 200 may be performed in a variety and combination of environments and architectures, including Internet/WWW-based applications, desktop applications, and WWW-enabled applications. In one exemplary architecture, a user 108 at a remote workstation 110 may have executing thereon software so that the user is not writing back to the central server database 126 until the user 108 chooses to save changes made. Until the changes are saved, the user is working in short-term memory and the user has the ability to perform "what if" scenarios.

As used herein, the term assertion means representations that are embodied in components being audited. For example, Statement on Auditing Standard No. 106, Audit Evidence (SAS No. 106), issued by the American Institute of Certified Public Accountants (AICPA), provides that assertions used by the auditor fall into the following categories:

a. Assertions about classes of transactions and events for the period under audit:
      i. Occuffence. Transactions and events that have been recorded have occurred and pertain to the entity.
      ii. Completeness. All transactions and events that should have been recorded have been recorded.
      iii. Accuracy. Amounts and other data relating to recorded transactions and events have been recorded appropriately.
      iv. Cutoff Transactions and events have been recorded in the correct accounting period.
      v. Classification. Transactions and events have been recorded in the proper accounts.
   b. Assertions about account balances at the period end:
      i. Existence. Assets, liabilities, and equity interests exist.
      ii. Rights and obligations. The entity holds or controls the rights to assets, and liabilities are the obligations of the entity.
      iii. Completeness. All assets, liabilities, and equity interests that should have been recorded have been recorded.
      iv. Valuation and allocation. Assets, liabilities, and equity interests are included in the financial statements at appropriate amounts and any resulting valuation or allocation adjustments are appropriately recorded.

c. Assertions about presentation and disclosure:
  i. Occurrence and rights and obligations. Disclosed events and transactions have occurred and pertain to the entity.
  ii. Completeness. All disclosures that should have been included in the financial statements have been included.
  iii. Classification and understandability. Financial information is appropriately presented and described and disclosures are clearly expressed.
  iv. Accuracy and valuation. Financial and other information are disclosed fairly and at appropriate amounts.

SAS No. 106 provides that the auditor may use these relevant assertions as described above or may express them differently provided aspects described above have been covered. Standard setting bodies other than the AICPA also refer to other assertions in grouping that are similar to but that may differ from the grouping in SAS No. 106. Assertions may be in the following six groupings: existence or occurrence, completeness, rights and obligations, valuation and allocation, accuracy and classification, and cutoff.

As shown in the various figures, the invention provides a system for using a risk-based approach to assess control risks associated with internal financial controls. The system, in one embodiment, includes a computer, such as shown in FIG. 1, having an associated memory, display, and input device. Many aspects of the invention are best implemented in software code and executed by the computer. A graphical user interface is used to present a user with various groupings of internal financial control items. The graphical user interface receives inputs from the user that are related to the internal financial control items, audit areas, transaction classes, design deficiencies, assessments, exception and testing.

The system may be set up to automatically and respectively group and present to a user subsets of internal financial control items with internal control components, such as control environment, risk assessment, information and communication, monitoring, and control activities. The system can associate previously identified risks with an internal financial control item and/or an internal control component and may present an indication of the existence of an associated risk and a risk description associated with the indicated risk as described above. The system may also group subsets of internal financial control items with transaction classes and audit areas and present the groupings to the user. The system may group transaction classes with audit areas and group subsets of internal financial control items with audit areas and/or transaction classes and present the groupings to the user.

The present invention may receive user test inputs designating an internal financial control item for testing and present a set of test procedures associated with the designated internal financial control item for use by the user. The system may document assessments with the set of test procedures and process inputs representing user assessment of the effectiveness of internal financial control items. The present invention may include code to filter internal financial control items based on a key control status and present a grouping of internal control items based on the key control status designation. Although largely discussed in terms of financial internal controls, the internal control items may relate to one or more of compliance, operational, financial, and regulatory controls.

The present invention is not to be limited in scope by the specific embodiments described herein, It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A computer-implemented method for assessing a plurality of internal financial control items, the method comprising:
  (a) automatically and respectively grouping subsets of the plurality of internal financial control items with one or both of a plurality of transaction classes and a plurality of audit areas based on an assessment of risk associated with one or more internal financial control items included in the plurality of internal financial control items, and presenting one or both of the plurality of transaction classes and the plurality of audit areas;
  (b) presenting on a display the plurality of internal financial control items;
  (c) processing by a processor an input set associated with at least some of the plurality of internal financial control items; and
  (d) automatically generating by the processor a set of assessment information based on the processed input set.

2. The method of claim 1 wherein the processing step includes processing at least one input from the input set that designates an internal financial control item for testing and the generating step includes presenting test procedures associated with the designated internal financial control item.

3. The method of claim 1 wherein the presenting step includes first automatically and respectively grouping subsets of the plurality of internal financial control items with a plurality of internal control components, the plurality of internal control components comprising control environment, risk assessment, information and communication, monitoring, and control activities.

4. The method of claim 3 wherein the presenting step includes presenting the subsets of internal financial control items based on an input representing a selection from among the plurality of internal control components.

5. The method of claim 3 wherein the plurality of internal control components are comprised of COSO components.

6. The method of claim 3 wherein the processing step includes processing at least one input designating a design deficiency associated with an internal control objective associated with one of the plurality of internal control components and the generating step includes generating an indication of design deficiency.

7. The method of claim 3 further comprising:
  associating a previously identified risk with one or both of an internal financial control item and an internal control component; and
  presenting an indication of the existence of an associated risk and a risk description associated with the indicated risk.

8. The method of claim 1 wherein the presenting step further comprises:
  prior to presenting, automatically and respectively grouping a plurality of transaction classes with a plurality of audit areas and selectively presenting the set of audit areas and transaction classes; and prior to presenting, automatically grouping subsets of the plurality of internal financial control items with one or both of the plurality of audit areas and the plurality of transaction classes.

9. The method of claim 8 wherein the presenting step further comprises:
prior to presenting, further grouping the subsets of the plurality of internal financial control items based on one or both of assertion and objective.

10. The method of claim 8 further comprising:
associating a previously identified risk with one or more of audit area, transaction class, and internal financial control item; and
presenting an indication of the existence of an associated risk and a risk description associated with the indicated risk.

11. The method of claim 1 further comprising:
automatically grouping and presenting a subset of the plurality of internal financial control items based on a user input related to an assessment of risk, whereby the method provides a risk based approach to risk assessment.

12. The method of claim 1 further comprising:
prior to the presenting step, automatically presenting a previously identified risk associated with one or both of an audit area and a transaction class associated with a subset of the plurality of internal financial control items.

13. The method of claim 1 further comprising:
receiving a user test input designating an internal financial control item for testing; and
presenting a set of test procedures associated with the designated internal financial control item.

14. The method of claim 13 further comprising documenting assessments associated with the set of test procedures.

15. The method of claim 1 further comprising:
receiving from a user a plurality of inputs representing user assessment of the effectiveness of internal financial control items; and
presenting a summary of the effectiveness assessments.

16. The method of claim 15 wherein the effectiveness assessments relate to one or more of internal financial control items, audit areas, transaction classes, assertions, exceptions, and internal control components.

17. The method of claim 15 further comprising:
grouping the effectiveness assessments by one or all of audit area, assertion, and transaction class and presenting the grouped effectiveness assessments.

18. The method of claim 15 wherein the plurality of user inputs includes at least one input representing a conclusion of internal control design effectiveness.

19. The method of claim 15 wherein at least one user assessment represents a design deficiency and the presenting step includes presenting a design deficiency summary.

20. The method of claim 15 wherein at least one user assessment represents an exception related to an internal financial control item and the presenting step includes presenting an exception summary.

21. The method of claim 1 further comprising:
receiving a set of user inputs adapted to designate at least some of the plurality of internal financial control items as having a key control status.

22. The method of claim 1 further comprising:
assigning and presenting a set of defaults designating at least some of the plurality of internal financial control items as having a key control status; and
allowing a user to change key control status designation.

23. The method of claim 1 further comprising:
filtering internal financial control items based on a key control status designation assigned to a subset of the plurality of internal financial control items; and
presenting the subset of the plurality of internal financial control items having the key control status designation.

24. The method of claim 1 further comprising:
generating work product associated with the execution of the assessment method.

25. The method of claim 1 further comprising:
performing a diagnostics operation to identify one or more of errors in data, inconsistencies in responses and inputs, omissions, incomplete procedures or responses, and reminders to user to consider internal control deficiencies identified.

26. The method of claim 1 wherein the presenting step comprises presenting a plurality of prompts designed to elicit responses and being associated with a set of risks associated with one or more of the plurality of internal control items.

27. The method of claim 1 wherein the method is at least in part carried out using one or more of an Internet-based application, an Internet-enabled application, and a desktop application.

28. The method of claim 1 wherein the method is conducted as part of an audit process, a financial statement audit, or as part of a separate audit, assessment, implementation, or maintenance of internal control.

29. A system for assessing risks associated with internal financial controls, the system comprising:
a computer having an associated memory, display, and input device and adapted to execute code;
a first code set adapted to automatically and respectively group subsets of the plurality of internal financial control items with one or both of a plurality of transaction classes and a plurality of audit areas based on an assessment of risk associated with one or more internal financial control items included in the plurality of internal financial control items;
a graphical user interface adapted to operate on the computer and to present one or both of the plurality of transaction classes and the plurality of audit areas and further adapted to present a plurality of internal financial control items, the graphical user interface further adapted to receive user inputs related to the set of internal financial control items via the input device; and
a second code set adapted to be executed on the computer and adapted to process the user inputs to generate a set of assessment information based on the received user inputs.

30. The system of claim 29 wherein the graphical user interface is adapted to present a set of prompts designed to elicit user inputs.

31. The system of claim 29 wherein the code set is further adapted to present by the graphical user interface a set of procedures based at least in part on the user inputs.

32. The system of claim 29 wherein the user inputs represent responses to risks associated with the plurality of internal financial control items.

33. The system of claim 29 further comprising a risk code set adapted to identify and present via the graphical user interface risks associated with at least some of the plurality of internal financial control items.

34. The system of claim 29 further comprising an exception code set adapted to enable a user to identify exceptions associated with at least some of the internal financial control items.

35. The system of claim 29 wherein the code set is further adapted to process at least one input from the input set that designates an internal financial control item for testing and the graphical user interface is further adapted to present test procedures associated with the designated internal control item.

36. The system of claim 29 wherein the code set is further adapted to automatically and respectively group subsets of the plurality of internal financial control items with a plurality of internal control components, the plurality of internal control components comprising control environment, risk assessment, information and communication, monitoring, and control activities.

37. The system of claim 36 wherein the graphical user interface is further adapted to present the subsets of internal financial control items based on receiving a user input designating one of the plurality of internal control components.

38. The system of claim 36 wherein the codes set is further adapted to process at least one input designating a design deficiency associated with an internal control objective associated with one of the plurality of internal control components and to generate an indication of design deficiency.

39. The system of claim 36 wherein the code set is further adapted to associate a previously identified risk with one or both of an internal financial control item and an internal control component and wherein the graphical user interface is further adapted to present an indication of the existence of an associated risk and a risk description associated with the indicated risk.

40. The system of claim 29 wherein the code set is further adapted to automatically and respectively group a plurality of transaction classes with a plurality of audit areas and to automatically group subsets of the plurality of internal financial control items with one or both of the plurality of audit areas and the plurality of transaction classes, and the graphical user interface is further adapted to selectively present the set of audit areas and transaction classes and the grouped subsets of the plurality of internal financial control items.

41. The system of claim 40 wherein the code set is further adapted to group the subsets of the plurality of internal financial control items based on one or both of assertion and objective.

42. The system of claim 40 wherein the code set is further adapted to associate a previously identified risk with one or more of audit area, transaction class, and internal financial control item and wherein the graphical user interface is further adapted to present an indication of the existence of an associated risk and a risk description associated with the indicated risk.

43. The system of claim 29 wherein the code set and the graphical user interface are respectively further adapted to automatically group and present a subset of the plurality of internal financial control items based on a user input related to an assessment of risk, whereby the system provides a risk based approach to risk assessment.

44. The system of claim 29 wherein the graphical user interface is further adapted to automatically present a previously identified risk associated with one or both of an audit area and a transaction class associated with a subset of the plurality of internal financial control items.

45. The system of claim 29 wherein the graphical user interface is further adapted to receive a user test input designating an internal financial control item for testing and present a set of test procedures associated with the designated internal financial control item.

46. The system of claim 45 wherein the graphical user interface is further adapted to receive user inputs associated with documenting assessments associated with the set of test procedures.

47. The system of claim 29 wherein the graphical user interface is further adapted to receive from a user a plurality of inputs representing user assessment of the effectiveness of internal financial control items and present a summary of the effectiveness assessments.

48. The system of claim 47 wherein the effectiveness assessments relate to one or more of internal financial control items, audit areas, transaction classes, assertions, exceptions, and internal control components.

49. The system of claim 47 wherein the code set and graphical user interface are respectively further adapted to group the effectiveness assessments by audit area and present the grouped effectiveness assessments.

50. The system of claim 47 wherein the plurality of user inputs includes at least one input representing a conclusion of internal control design effectiveness.

51. The system of claim 47 wherein at least one user assessment represents a design deficiency and wherein the graphical user interface is further adapted to present a design deficiency summary.

52. The system of claim 47 wherein at least one user assessment represents an exception related to an internal financial control item and wherein the graphical user interface is further adapted to present an exception summary.

53. The system of claim 29 wherein the graphical user interface is further adapted to receive a set of user inputs adapted to designate at least some of the plurality of internal financial control items as having a key control status.

54. The system of claim 29 wherein the code set and graphical user interface are respectively further adapted to assign and present a set of defaults designating at least some of the plurality of internal financial control items as having a key control status and to receive and process user inputs changing key control status designation.

55. The system of claim 29 wherein the code set is further adapted to filter internal financial control items based on a key control status designation assigned to a subset of the plurality of internal financial control items and the graphical user interface is further adapted to present the subset of the plurality of internal financial control items having the key control status designation.

56. The system of claim 29 wherein the code set is further adapted to generate work product associated with processed user assessments of internal financial control items.

57. The system of claim 29 wherein the code set is further adapted to perform a diagnostics operation to identify one or more of errors in data, inconsistencies in responses and inputs, omissions, incomplete procedures or responses, and reminders to user to consider internal control deficiencies identified.

58. The system of claim 29 wherein at least some of the code executed by the computer is one or more of Internet-based, Internet-enabled, and a desktop application.

59. The system of claim 29 wherein the assessment information is generated as part of an audit process, a financial statement audit, or as part of a separate audit, assessment, implementation, or maintenance of internal control.

60. A computer program for assessing risks associated with internal financial controls and embodied in a non-transitory computer-readable medium configured for execution on a computer having an associated memory, display, and input device, the computer program comprising:

a first code set adapted to automatically and respectively group subsets of the plurality of internal financial control items with one or both of a plurality of transaction classes and a plurality of audit areas based on an assessment of risk associated with one or more internal financial control items included in the plurality of internal financial control items;

a graphical user interface adapted to operate on the computer and adapted to present one or both of the plurality of transaction classes and the plurality of audit areas and further adapted to present a plurality of internal financial control items, the graphical user interface further adapted to receive user inputs related to the set of internal financial control items via the input device; and a second code set adapted to be executed on the computer and adapted to process the user inputs to generate a set of assessment information based on the received user inputs.

61. The computer program of claim 60 comprising a risk code set adapted to identify and present via the graphical user interface risks associated with at least some of the plurality of internal financial control items.

62. The computer program of claim 60 further comprising an exception code set adapted to enable a user to identify exceptions associated with at least some of the internal financial control items.

63. The computer program of claim 60 wherein the code set is further adapted to process at least one input from the input set that designates an internal financial control item for testing and the graphical user interface is further adapted to present test procedures associated with the designated internal control item.

64. The computer program of claim 60 wherein the code set is further adapted to automatically and respectively group subsets of the plurality of internal financial control items with a plurality of internal control components, the plurality of internal control components comprising control environment, risk assessment, information and communication, monitoring, and control activities.

65. The computer program of claim 64 wherein the graphical user interface is further adapted to present the subsets of internal financial control items based on receiving a user input designating one of the plurality of internal control components.

66. The computer program of claim 64 wherein the codes set is further adapted to process at least one input designating a design deficiency associated with an internal control objective associated with one of the plurality of internal control components and to generate an indication of design deficiency.

67. The computer program of claim 64 wherein the code set is further adapted to associate a previously identified risk with one or both of a control item and a control component and wherein the graphical user interface is further adapted to present an indication of the existence of an associated risk and to present a risk description associated with the indicated risk.

68. The computer program of claim 60 wherein the code set is further adapted to automatically and respectively group a plurality of transaction classes with a plurality of audit areas and to automatically group subsets of the plurality of internal financial control items with one or both of the plurality of audit areas and the plurality of transaction classes, and the graphical user interface is further adapted to selectively present the set of audit areas and transaction classes and the grouped subsets of the plurality of internal financial control items.

69. The computer program of claim 68 wherein the code set is further adapted to group the subsets of the plurality of internal financial control items based on one or both of assertion and objective.

70. The computer program of claim 68 wherein the code set is further adapted to associate a previously identified risk with one or more of audit area, transaction class, and internal financial control item and wherein the graphical user interface is further adapted to present an indication of the existence of an associated risk and to present a risk description associated with the indicated risk.

71. The computer program of claim 60 wherein the code set and the graphical user interface are respectively further adapted to automatically group and present a subset of the plurality of internal financial control items based on a user input related to an assessment of risk, whereby the program provides a risk based approach to risk assessment.

72. The computer program of claim 60 wherein the graphical user interface is further adapted to automatically present a previously identified risk associated with one or both of an audit area and a transaction class associated with a subset of the plurality of internal financial control items.

73. The computer program of claim 60 wherein the graphical user interface is further adapted to receive a user test input designating an internal financial control item for testing and present a set of test procedures associated with the designated internal financial control item.

74. The computer program of claim 60 wherein the graphical user interface is further adapted to receive from a user a plurality of inputs representing user assessment of the effectiveness of internal financial control items and present a summary of the effectiveness assessments, and wherein the effectiveness assessments relate to one or more of the group consisting of: internal financial control items, audit areas, transaction classes, assertions, exceptions, internal control components, and conclusions of internal control design effectiveness.

75. The computer program of claim 74 wherein the code set and graphical user interface are respectively further adapted to group the effectiveness assessments by one or both of audit area and transaction class and to present the grouped effectiveness assessments.

76. The computer program of claim 74 wherein at least one user assessment represents one or both of a design deficiency and an exception and wherein the graphical user interface is further adapted to present one or both of a design deficiency summary and an exception summary.

77. The computer program of claim 60 wherein the graphical user interface is further adapted to receive a set of user inputs adapted to designate at least some of the plurality of internal financial control items as having a key control status.

78. The computer program of claim 60 wherein the code set and graphical user interface are respectively further adapted to assign and present a set of defaults designating at least some of the plurality of internal financial control items as having a key control status and to receive and process user inputs changing key control status designation.

79. The computer program of claim 60 wherein the code set is further adapted to filter internal financial control items based on a key control status designation assigned to a subset of the plurality of internal financial control items and the graphical user interface is further adapted to present the subset of the plurality of internal financial control items having the key control status designation.

80. A computer-implemented method for assessing a plurality of internal control items, the method comprising:
(a) automatically grouping and presenting a subset of the plurality of internal control items based on an assessment of risk associated with one or more internal control items included in the subset of internal control items;
(b) automatically and respectively grouping subsets of the plurality of internal control items with one or both of a plurality of transaction classes and a plurality of audit areas;
(c) processing by a processor a set of inputs associated with at least some of the subset of internal control items; and
(d) generating a set of assessment information based on the processed set of inputs.

81. The method of claim 80 wherein the grouping and presenting step includes presenting a previously identified risk associated with an audit area associated with the subset of internal control items.

82. The method of claim 80 wherein the grouping and presenting step includes presenting a previously identified risk associated with a transaction class associated with the subset of internal control items.

83. The method of claim 80 further comprising:
receiving a user test input designating an internal control item for testing; and
presenting a set of test procedures associated with the designated internal control item.

84. The method of claim 83 further comprising documenting assessments associated with the set of test procedures.

85. The method of claim 80 further comprising:
receiving from a user a plurality of inputs representing user assessment of the effectiveness of internal control items; and
presenting a summary of the effectiveness assessments.

86. The method of claim 85 wherein the effectiveness assessments relate to one or more of internal control item, assertion, audit area, transaction class, and internal control component.

87. The method of claim 86 further comprising:
presenting design effectiveness exceptions against at least some of the subset of internal control items.

88. The method of claim 87 further comprising:
grouping the effectiveness assessments by one or both of audit area and transaction class and presenting the grouped effectiveness assessments.

89. The method of claim 87 wherein the internal control items relate to one or more of compliance, operational, financial, and regulatory controls.

* * * * *